United States Patent [19]
Stewart

[11] Patent Number: 5,519,261
[45] Date of Patent: May 21, 1996

[54] POWER MANAGEMENT CONTROL SYSTEM FOR BATTERY POWERED DEVICES

[75] Inventor: Gregory N. Stewart, Austin, Tex.

[73] Assignee: Dell U.S.A., L.P., Austin, Tex.

[21] Appl. No.: 421,305

[22] Filed: Apr. 6, 1995

Related U.S. Application Data

[63] Continuation of Ser. No. 12,696, Feb. 3, 1993, abandoned, which is a continuation of Ser. No. 656,265, Feb. 14, 1991, abandoned.

[51] Int. Cl.$^6$ ..................................................... H02J 7/34
[52] U.S. Cl. .............................. 307/87; 307/66; 307/150
[58] Field of Search ............................. 307/64–66, 70, 307/10.7, 85–87, 132 E, 132 EA, 150; 361/166, 167

[56] References Cited

U.S. PATENT DOCUMENTS

| | | | |
|---|---|---|---|
| 4,255,697 | 3/1981 | Buhler, III | 307/66 X |
| 4,323,788 | 4/1982 | Smith | 307/66 |
| 4,451,742 | 5/1984 | Aswell | 307/66 |
| 4,645,943 | 2/1987 | Smith, Jr. et al. | 307/150 |
| 4,673,826 | 6/1987 | Masson | 307/66 |
| 5,148,042 | 9/1992 | Nakazoe | 307/66 X |
| 5,300,874 | 4/1994 | Shimamoto et al. | 307/66 X |

FOREIGN PATENT DOCUMENTS

| | | | |
|---|---|---|---|
| 0335316 | 10/1989 | European Pat. Off. | 307/150 |
| 3-265425 | 11/1991 | Japan | 307/10.7 |

*Primary Examiner*—Fritz M. Fleming
*Attorney, Agent, or Firm*—Haynes and Boone; Michelle M. Turner

[57] ABSTRACT

Method and apparatus for increasing the amount of power that may be extracted from a plurality of parallel connected battery banks by periodically effecting a switching between the banks for operative coupling to the power supply of an electronic or electrical device. The apparatus comprises at least two battery banks, a switching means, a microcontroller and a battery powered load. Upon each expiration of a predetermined time interval, the microcontroller monitors the voltage of the battery banks to determine which of the banks has the highest voltage. The microcontroller then positions the switch so that the bank with the highest voltage is coupled to the power supply of the load. In another embodiment, switching occurs upon a determination that the active bank has reached a specified power output.

3 Claims, 1 Drawing Sheet

POWER MANAGEMENT CONTROL SYSTEM FOR BATTERY POWERED DEVICES

CROSS REFERENCE TO RELATED APPLICATION

This is a continuation of application Ser. No. 08/012,696 filed on Feb. 3, 1993, now abandoned which is a continuation of application Ser. No. 07/656,265 filed Feb. 14, 1991, now abandoned, for Rechargeable System with Separate Battery Circuits in a Common Module.

TECHNICAL FIELD

The invention relates generally to battery powered electrical and electronic systems and specifically to the efficient power management of battery capacity within such systems.

BACKGROUND OF THE INVENTION

An increasing number of electrical and electronic systems are being designed to be powered by batteries. Prime examples of such systems include portable computers such as laptops and notebooks. Portable computers are rapidly developing the capability to include most of the peripheral devices and high speed circuitry previously implemented only on conventional desktop personal computers. As the number of peripheral devices supported by portable computers increases, so does the amount of power consumed by the computer. As a result, it has become increasingly difficult to provide users with the maximum functionality and still maintain a reasonable battery life.

In early stages of the development of portable computers, it was possible to accomodate increased power demands by chaining several large capacity batteries together in series. With the demand for smaller, more light-weight computers, it is necessary to use a larger number of smaller batteries. The smaller battery cells are chained together in series to achieve the required watt/hour power rating to run the computer. Generally, these batteries are a rechargeable type, such as nickel cadmium (NiCd) cells, as they are capable of greater longevity and therefore are considered more economical than regular alkaline batteries.

However, the number of cells that can optimally be chained together in series is limited because as the number of cells increases, it becomes more difficult to detect and prevent cell damage due to a condition referred to as "reverse charging." It is recognized that even closely matched cells connected in series will never have exactly the same power capacity, with the result being the lower capacity cell (or cells) becomes discharged more quickly than the higher capacity cells. Once discharged completely, current from the other cells flow through the discharged cell in the reverse direction. Such reverse charging of a cell causes it to overheat and, eventually, causes permanent damage to the cell. Reverse charging of a cell can lead to leakage of electrolyte and thus damage to surrounding components.

Since the number of cells that can be chained together in series is limited, typically two or more small chains of cells connected series are configured as separate banks which are then connected in parallel. Problems associated with connecting multiple rechargeable battery banks in parallel are well recognized. For example, the banks must be electrically isolated from one another to prevent one bank from discharging another one, should one bank experience a short circuit. The typical way of connecting multiple banks is by installing diodes in the lines connecting the banks so that current can exit each bank, but not be allowed to enter another bank in parallel. This solution is not entirely satisfactory because each diode dissipates a considerable amount of power, so less power is available to be supplied to the computer.

Another problem involved in battery powered systems is that in practical applications, such as a portable computer environment, the batteries are discharged at a rate which is greater than the optimal rate. Due to limits on ion mobility, the chemical reaction taking place in the cell has insufficient time to equalize throughout the cell. As a result, less energy can be extracted from each cell than would be the case if the cells were discharged more slowly or were allowed to be inactive for a period of time to allow the batteries to equalize. As used herein, the term "inactive" means not being charged or discharged.

A solution is needed which both minimizes power losses associated with existing battery arrangements and further which effectively manages the rate of battery discharge among multiple banks in order to extend total battery run time.

SUMMARY OF THE INVENTION

The foregoing problems are solved and a technical advance is achieved by method and apparatus for extending total battery life by intermittently switching the operative coupling of a power load between alternative banks of batteries connected in parallel to the load. In a departure from the art, the battery banks are isolated from one another by a controlled switching arrangement, rather than by diodes, thereby eliminating the dissipation of power by the diodes. In a further departure from the art, a microcontroller periodically monitors the banks so that a decision to switch from one bank to another is based on elapse of a predetermined time interval. Upon elapse of each interval, the bank possessing the higher voltage among the banks being compared is coupled to the load.

In an illustrative embodiment, a battery power management control system of the present invention comprises at least two banks of batteries connected in parallel via a relay switch to a load. In one implementation, the load comprises various components of a portable computer. A microcontroller controls actuation of the relay switch and thereby determines which of the banks is connected to the load through a power supply. The banks are connected to the microcontroller via operational amplifiers (op-amps), which scale and filter a voltage signal of each bank, and an analog-to-digital (A/D) converter, which interfaces with the microcontroller. Upon each elapse of a predetermined time interval, the microcontroller reads the voltage of the banks and determines which of the banks has the highest voltage potential. The microcontroller then positions the relay switch so that the bank having the highest voltage is coupled to the power supply. Consequently, each bank remains inactive for a period of time sufficient to allow the batteries to chemically equalize, thereby enabling more energy to be drawn from the banks than would otherwise be possible.

In another embodiment, the microcontroller of the system periodically reads both the voltage and current of the battery banks, and computes an instantaneous power output of each bank. The power output values are accumulated and used to compute a total power output of the then active bank, since it was last inactive. When the total power output reaches a predetermined threshold, the relay switch uncouples the bank and couples the next bank. This enables an even discharge among the banks which may be experiencing differing discharge rates when active, due to the changing demands of the load.

A technical advantage achieved with the invention is improved battery longevity between charges for systems with power demands requiring a high battery discharge rate.

Another technical advantage achieved is a battery system with a flat voltage discharge characteristic, resulting in improved power efficiency and system reliability.

A further technical advantage achieved is versatility in implementation of the control system of the invention. The system is readily configured and easily modified for any arrangement of batteries and loads.

DESCRIPTION OF THE PREFERRED EMBODIMENT

Figure 1:
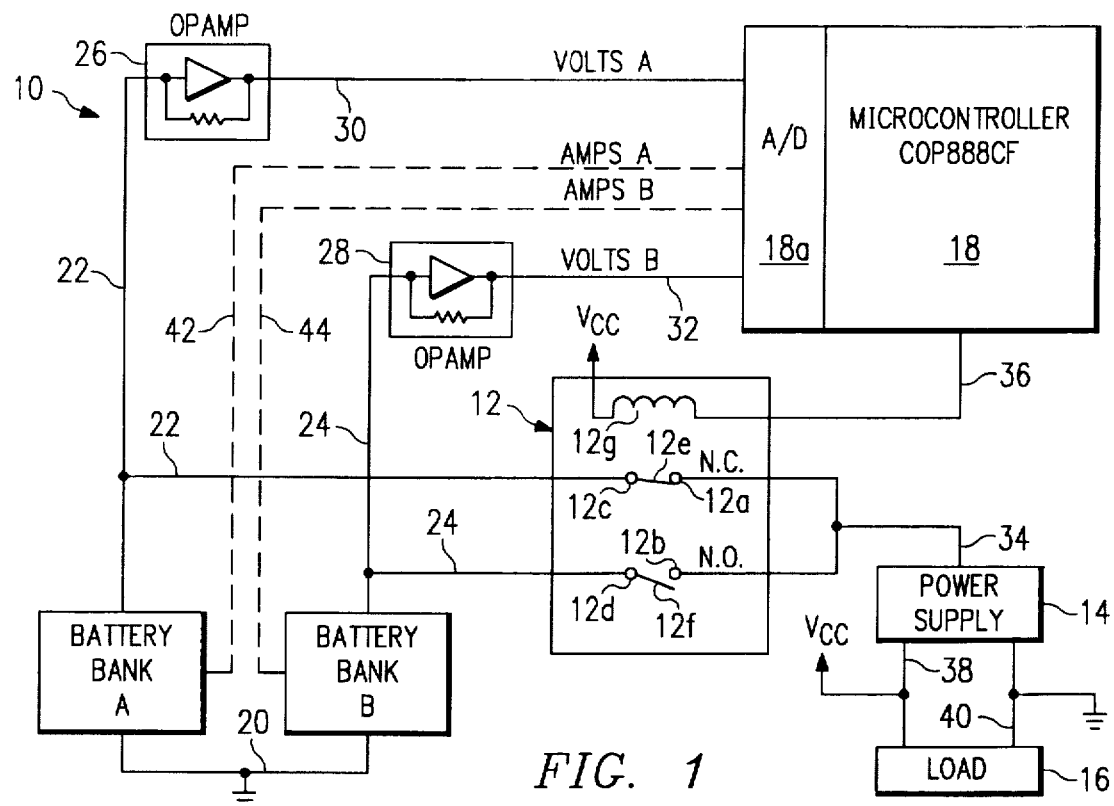
FIG. 1 is a schematic block diagram of a parallel battery bank charging and discharging control system embodying features of the present invention.

Referring to FIG. 1, reference numeral 10 designates a parallel battery bank charging and discharging control system embodying features of the present invention. The system 10 includes battery banks A and B, a relay switch 12, a power supply 14 connected to a load 16, and a microcontroller 18. It is understood that the load 16 may consist of any electrical or electronic device or circuit designed to run on batteries, for example a portable computer. As will be described, the system 10 operates under the control of the microcontroller 18 to efficiently supply power to the load 16 by alternating between use of banks A and B.

Battery banks A and B each comprise one or more battery cells (not shown) connected in series. For computer applications, the cells are often packaged in a self-contained, removable pack which comprises each of the banks A and B. In one embodiment, for example, each bank A and B includes a chain of seven (7) size "4/3 A" Nickel-Cadmium (NiCd) cells.

A line 20 connects a negative terminal of each of the banks A and B to electrical ground (GND). Lines 22 and 24 respectively connect a positive terminal of each of the banks A and B to the relay switch 12 and to respective operational amplifiers (op-amps) 26 and 28. Lines 30 and 32 respectively connect the op-amps 26 and 28 to an analog-to-digital (A/D) converter 18a. The A/D converter 18a preferably comprises part of the circuitry of the microcontroller 18.

The relay switch 12 is a double pole, double throw switch having a normally-closed (NC) lead 12a and a normally-open (NO) lead 12b, both connected via a line 34 to the power supply 14. Leads 12c and 12d of the switch 12 are respectively connectable by movable wiper arms 12e and 12f to the leads 12a and 12b. The leads 12c and 12d are respectively connected to the lines 22 and 24. As shown in FIG. 1, the switch 12 is in a first position in which the battery bank A is electrically connected via the lines 22 and 34 to the power supply 14. An actuator 12g of the switch 12 is provided for changing the state of the switch to a second position to electrically disconnect battery bank A from the power supply 14 and instead electrically connect battery bank B to the power supply 14, via lines 24 and 34. The actuator 12g is connected to a voltage source Vcc and to the microcontroller 18 via a control line 36. The microcontroller 18 controls the state of the switch 12 via the control line 36 in a manner subsequently described in detail.

In the preferred embodiment, the microcontroller 18 is commercially available from National Semiconductor as part number COP888CF. The architecture and design of the microcontroller 18 will depend on the particular requirements of the system 10. While not shown, it is understood that a microprocessor, logic devices, memory and other components are included in the microcontroller 18, as necessary. It is understood that the operation of the microcontroller 18 may be implemented by microcode instructions (firmware) stored in the microcontroller 18. The means of construction and programming of the microcontroller 18 will be apparent to one skilled in the art from the disclosure herein and the general state of the art.

The power supply 14 is connected to the load 16 via lines 38 and 40. Lines 38 and 40 are respectively connected to a voltage source Vcc and ground (GND).

Lines 42 and 44 are connected between the banks A and B, respectively, and the A/D converter 18a and are provided for furnishing amperage information regarding each bank to the microcontroller 18, for reasons subsequently described.

While not shown, it is understood that a battery charging circuit may be suitably incorporated in the system 10 for recharging the battery banks A and B. The switch 12 isolates the banks A and B from one another during charging. It is further understood that, although only two banks A and B are illustrated in FIG. 1, the system 10 circuitry can be extended to any number of additional banks.

In operation, the voltage signals of the banks A and B are filtered and scaled by the op-amps 26, 28, and then supplied to the A/D converter 18a for appropriate conversion prior to being input to the microcontroller 18. Upon each elapse of a predetermined time interval, the microcontroller 18 reads the voltage signals and determines which of the banks A or B has the greatest voltage capacity. It is understood that the optimal predetermined time interval is that which results in the maximum increase in battery run time. The optimal predetermined time interval between reading the condition of the banks A and B to make switching decisions is a function of the capacity of the battery banks and the characteristics of the particular load 16. For certain applications of the system 10 involving a portable computer, it has been determined that an optimal predetermined time period between banks A and B switching decisions by the microcontroller 18 is four (4) minutes.

The microcontroller 18 causes the switch 12 to be positioned so that the bank A or B having the highest voltage is coupled to the power supply 14. For example, the switch 12 as illustrated in FIG. 1 is initially positioned so that bank A is coupled to the power supply 14. After the predetermined time interval has elapsed, the microcontroller 18 reads the voltage signals on lines 30 and 32. If the microcontroller 18 determines that bank B has a higher voltage than bank A, it causes the switch 12 to uncouple bank A from the power supply 14 and couple bank B to the power supply 14. Conversely, if the microcontroller 18 determines that bank A the higher voltage, bank A remains coupled to the power supply 14.

In an alternative embodiment, banks A and B are further coupled to the microcontroller 18 by the lines 42, 44, respectively, which carry signals containing information regarding the amperage of banks A and B, respectively. In periodic intervals on the order of once every second, for example, the microcontroller 18 uses the voltage information on the lines 30, 32 and the amperage information on the lines 42, 44 to compute the instantaneous power output of the then active bank A or B. The instantaneous power output values are accumulated by the microcontroller 18 and used to calculate an approximation of the total power output by the active bank A or B since that bank was last inactive. When the accumulated value is equal to some predetermined threshold value, the relay switch 12 is switched so that the then inactive bank A or B is instead coupled to the power supply 14.

The switching decision is thus based on the total power output by the bank A or B during a particular period of activity, rather than simply based on the length of the period. This may be desirable when the load 16 varies because it includes devices or components which consume more power than others. For example, where the load 16 comprises components of a computer and a particular bank is supplying power to the computer during an interval of time in which the disk drive is constantly running, that particular bank will discharge at a higher rate than will a bank that is active when the disk drive is not running.

Figure 2:
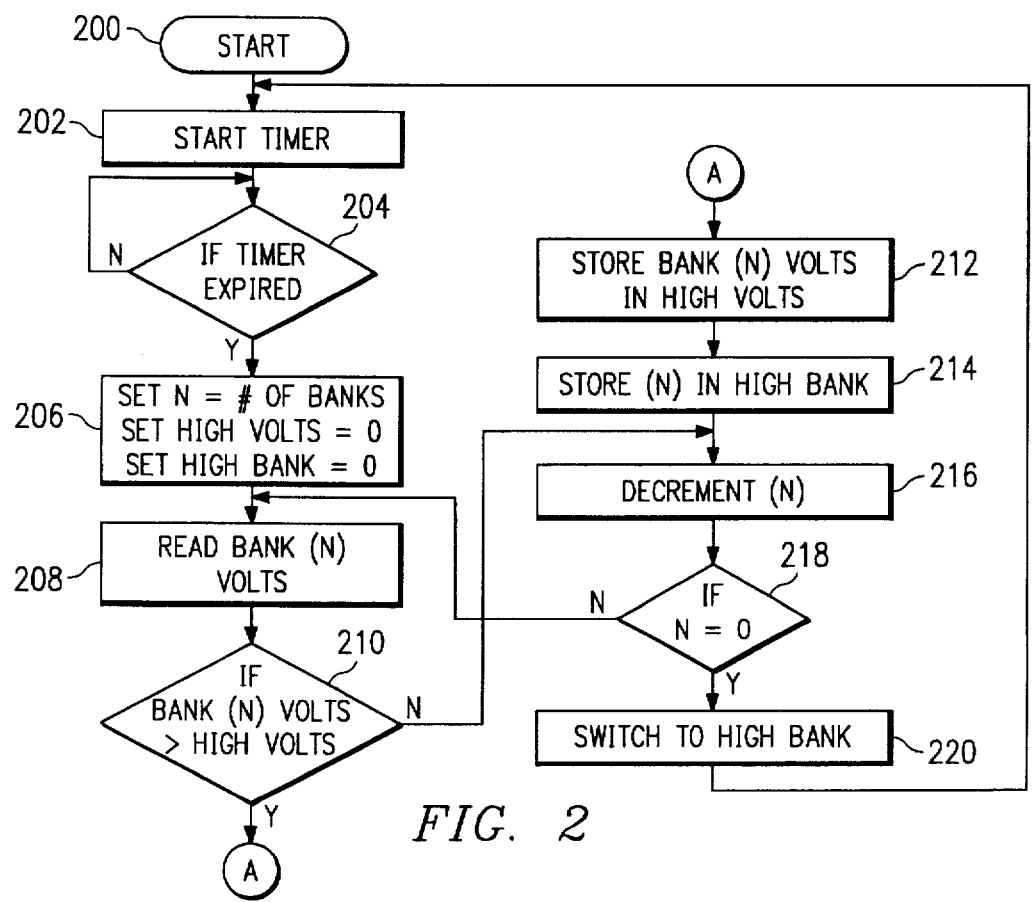
FIG. 2 is a flowchart illustrating switch control logic implemented in a microcontroller of the system of FIG. 1. A copy of the source code illustrated by FIG. 2 is provided in Appendix A, attached hereto.

FIG. 2 is a flowchart illustrating control logic for operating the system 10 in accordance with the present invention. It is understood that the control logic may be implemented by microcode instructions contained within the microcontroller 18.

Execution begins in step 200. In step 202, a timer is initialized to a predetermined value and begins to run. In the present embodiment, it is understood the timer resides in the microcontroller 18 and is used as a counter to enable switching decisions upon elapse of a predetermined time interval. In step 204, a determination is made whether the timer has expired. If the timer has expired, execution proceeds to step 206. If the timer has not expired, execution returns to step 204 until the timer expires.

In step 206, variables HIGH VOLTS and HIGH BANK are initialized to zero. HIGH VOLTS represents the value of the highest voltage read from the banks and HIGH BANK represents the identity of the bank having the highest voltage. Also in step 206, a variable N is initialized to equal the number of battery banks in the system 10. In step 208, the microcontroller 18 reads the voltage of the Nth bank. In step 210, a determination is made whether the voltage read in step 208 is greater than HIGH VOLTS. If so, execution proceeds to step 212 where the voltage read in step 208 is stored in HIGH VOLTS. In step 214, N is stored in HIGH BANK. If in step 210, the voltage read in step 208 is not greater than HIGH VOLTS, control proceeds directly to step 216.

In step 216, N is decremented by 1. In step 218, a determination is made whether N is equal to zero. If N is equal to zero, indicating that all the banks have been read, execution proceeds to step 220 and the microcontroller 18 positions the switch 12 so that the bank identified by HIGH BANK is coupled to the power supply 12. Execution then returns to step 202 and continues as previously described. If in step 218, N is not equal to zero, indicating that at least one bank remains to be read, execution returns to step 208 and the voltage of the next bank is read and compared as previously described.

It is understood that the present invention can take many forms and embodiments. The embodiments shown herein are intended to illustrate rather than to limit the invention, it being appreciated that variations may be made without departing from the spirit of the scope of the invention. For example, the switch 12 may be implemented using field effect transistors (FETs), rather than a relay switch as herein described, or may be implemented in various forms of logic. Further, it will be appreciated that different elements of the system may be embodied as a single integrated chip, or any varying combination of discrete digital or analog components interconnected in a standard manner. Also, any number or type of battery banks may be connected in parallel for furnishing power to the system load. The load may comprise any device or devices requiring power. Examples include, inter alia, circuits, lighting devices and consumer electronic products such as camcorders, players and portable telephones.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

APPENDIX

A sample source code implementation is set forth, in the following appendix, to ensure the fullest possible compliance with the best mode requirements of US patent law. Although the following code does represent the state of this code as of the effective filing date of the present application, it must be noted that this specific example is still under development. It is expected that this code will later be modified to add functionality, improve performance, and possibly also to remove bugs. Thus, users are warned that the following example should be regarded as an engineering prototype rather than a finished product, and should be used only with great caution. This assembly language code is written for the COP888CF microcontroller.

Page A-ii

```
.title COP888, 'Power Management'
.list 078      ;058    ;05F lists all macro expansion details for debug +020 for incld
.incld cop888.inc
.incld except.mac
.incld pwrmgmt.inc

;       NAME    PWRMGMT.MAC

;************************************************************
;* Copyright (c) 1990 Dell Computer Corporation, Inc. This program     *
;* contains proprietary and confidential information. All rights reserved *
;* except as may be permitted by prior written consent.                *
;************************************************************

;************************************************************
;       Revision Information   $Revision:  1.36 $
;                              $Date:     01 Feb 1991  9:07:00 $
;************************************************************

;
; This program uses the Idle timer of the COP888CF for its time reference.
; At an 8MHz clock this coresponds to a resolution interval of 5.12 msec.
; (4096 counts at .8MHz per timer tick)
;
; This program begins by setting up the ports for direction and
; enabling the watch dog timer.

jp      start
        .byte   'N09'
Start:
        ld      pendng, #00         ;no delayed operations to start
        ld      mode, #0
        ld      crgmde, #0
        ld      flashb, #080
        ld      alrmct, #0
        ld      tdelay, #200        ;1 sec turn on delay
        ld      batcnt, #min1       ;first battery change in 1 minute
```

Page A-iii

```
        ld      portcc, #0
        ld      portcd, #0
        ld      portlc, #0
        ld      portld, #0
        ld      portgc, #0
        ld      portgd, #0
        ld      ened, #0            ;Put A/D in low power mode ld      second, #seccnt     ;initialize timeout
        ld      minute, #mini jsrl    xsump               ;test the validity of the current params
        ifeq    a, xsumpd
        jp      sysok ld      systim, #min4       ;set default values
        ld      hdtim, #min4
        ld      lcdtim, #min4
        ld      sysbyt, #02F
sysok:
        jsr     stmout              ;set the initial timeouts ld      portcd, #01C        ;initial C port data
        ld      portcc, #01F        ;make C0 and C1 - C4 outputs
        ld      b, #oplow
        ld      [b], #0
        jsr     putlow
        ld      b, #ophigh
        ld      [b], #sampson+fetoff ;Start at high speed, video off, opamps on
        jsr     puthi               ;This is to get around powerup
                                    ; problem with MILES
        jsr     dely50              ;Wait 50 msec for power to go away
        rbit    5, icntrl           ;clear the T0 overflow bit
        setbit  hdcs0, wkedg        ;Look for low going edges
        jsr     cksram              ;check sram parameters
        jsr     ckrbat              ;test reserve
        bitif   syson, portgp       ;Is the power switch on?
        jp      nstart              ; Yes, then normal start sequence
        clrbit  syson, flashb      ;**

bitif   acav, portcp        ;Next test for AC power
```

Page A-iv

```
        jmp     spmoff          ; Shouldn't be here if no AC ld      portcd, #01C    ;initial C port data
        ld      portcc, #017    ;make C0 - C2 outputs
        jsrl    c20off          ;turn off video
        jsrl    stchrg          ;start the charger
        sbit    4, icntrl       ;enable T0 interrupt
        jmp     cmain           ;main loop for charge
nstart:
        clrbit  purled, portcd  ;turn on power LED
        setbit  syson, flashb   ;**
        jsrl    c20on           ;turn on video
        jsr     vinit           ;initialize voltage readings
        jsr     dlypmd          ;reset power monitoring mode
        ld      wkpnd, #0       ;clear any pending interrupts
        setbit  bdt, wken       ;enable battery detect interrupt
;**     setbit  kbdint, wken
        sbit    4, icntrl       ;enable T0 interrupt
        sbit    6, icntrl       ;enable L port wakeup interrupt
        sbit    1, psw          ; enable external interrupt
main:
        sbit    0, psw          ;global interrupt enable
        nop                     ;service all interrupts now
        nop
        nop
        rbit    0, psw          ; now turn them back off
        bitif   syson, portgp   ;Monitor system switch
        jp      main00
        bitif   bdt, mode       ;are we waiting for a new battery?
        jmp     reslop          ;wait for new battery
        jmp     reset
main00:
        bitif   acav, portcp    ;test for ac available
        jp      main10          ; if operating from batteries
        jsr     clrtob
        bitif   chrgrb, crgmde  ;if reserve battery being charged
        jp      main01          ; don't turn on trickle charger
        bitif   trklec, crgmde  ;Allow trickle charge when AC available
        jp      main01          ; if already set
        bitif   charge, crgmde  ;** remove for production
        jp      main01          ;**
```

Page A-v

```
        jsr     trklon          ;start trickle charge
main01:
        jp      main
main10:
        bitif   trklec, crgmde  ;only true if AC adapter just unpluged
        jsr     trklof          ; turn off trickle charge
        bitif   bdt, mode       ;are we waiting for a new battery?
        jmp     reslop          ;wait for new battery before testing voltage
        bitif   lobat3, mode    ;are we about to shut down system?
        jmp     lo3lop          ;then wait for AC or new battery
        jmp     main            ;wait before measuring batteries cksm00:
        laid
        ret ;
; The cop888cf has a vectored interrupt scheme. On an interrupt
; the program branches to the instruction at 0FFh. The program can
; then save the appropriate registers and issue a VIS instruction
; to branch to the interrupt handler.
;
        .=0ff ; This routine saves the contents of A, B, and X on entry to an interrupt
; and restores them on exit.

push    a               ;this is the only register we can save on stack
        x       a,b             ;move contents of b to a
        ld      b,#saveb        ;point to location to save B and X
        x       a,[b+]          ;save contents of original B register
        x       a,x             ;get contents of X register
        x       a,[b]           ;and save in data ram
        vis
restor:
        ld      b,#savex        ;point to location of saved X register
        x       a,[b-]          ;get old X contents
        x       a,x             ;and put back in X
        x       a,[b]           ;now get the saved contents of B
        x       a,b             ;and put it back in B
        pop     a               ;now we're back where we started
```

Page A-vi

```
        reti
;
; Timer T0 underflow interrupt vector
;
timer0:
        ld      wdcnt, #009     ;service watch dog 2-65K window, clock monitor on
        jsr     tstac
        bitif   sysan, flashb   ;is the cpu operating
        jp      tim00
        jp      tim01           ; if not skip standby and refresh
tim00:
        bitif   hldreq, mode    ;test for cpu in hold
        jsr     refrsh          ; and do refresh if so
        jsr     tststb          ; then check for activation
        bitif   hldreq, mode    ;are we in standby mode
        jsr     flashp          ; then flash the power led
        bitif   lobat2, mode    ;is the battery low
        jsr     flshlb          ; then flash the low bat led
        ifeq    pendng, #0      ;test for hd routine pending
        jp      tim01
        jsrl    iowlf7          ;test hd busy status
tim01:
        drsz    second          ;decrement seconds timer
        jp      t0exit          ;exit if not zero
        jsr     deccnt          ;executed once every second
t0exit:
        bitif   bdt, mode
        jp      tim02           ;skip if waiting for battery
        ifeq    tdelay, #0      ;test new battery delay
        jp      tim02
        drsz    tdelay
        jp      tim02           ;wait to initialize
        jsr     resoff          ; then reset voltage readings
tim02:
        bitif   bdt, mode       ;test for operation on reserve
        jsr     tstnew          ; look for a new battery
        bitif   cngoff, crgmde  ;Have we switched batteries
        jsr     resoff          ; then turn off the reserve battery
        bitif   cngben, crgmde  ;Is battery change enabled?
        jsr     docngb          ; then actually switch the battery banks
        rbit    5,icntrl
```

Page A-vii

```
        jmp     restor
;
; Software interrupt vector
;
reserv:                         ;***** TEMPORARY ******
swivec:
        jsr     tog             ;Light all the LED's
        jp      .       ;**
        rpnd
        jmp     reset ;
; Decrement the various timeout counters
;
deccnt:
        ld      second, #seccnt ;reset the seconds counter
        bitif   bdt, mode       ;are we operating on reserve?
        jsr     incrti          ; then increment reserve operation time
        drsz    minute          ;decrement the minute counter
        jp      dec01           ; until the minute is up
        bitif   bdt, mode       ;one minute on reserve battery?
        jmp     spmoff          ; then turn off system
        bitif   lobet3, mode    ;10 seconds at cutoff level?
        jmp     spmoff          ; then turn off system
        jsr     decmin          ; then do our once a minute stuff
dec01:
        bitif   stdeb2, flashb  ;We don't need to look unless switch is down
        jsr     tstpos          ;check for case closed
        jsr     reeded          ;make new readings once per second
        bitif   charge, crgmde  ;are we charging the batteries?
        jmp     adjcrg          ; if so then check for end, etc.
        ld      a, sysbyt       ;to speed up checks bitif   acav, portcp   ;test for ac available
        jp      dec02           ;jmp if no AC
        bitif   acovrd, a       ;test for AC override
        jmp     stmout          ; and reset timeout counters if active
dec02:
        bitif   hdsec, a        ;is the hd timeout in seconds?
        jsr     rldhdc          ;reset the hard disk timeout
        ld      a, sysbyt       ;to speed up checks
```

Page A-viii

```
        bitif   lcdsec, a       ;is lcd T.O. in seconds
        jsr     rldlcd
        ld      a, sysbyt       ;to speed up checks
        bitif   syssec, a       ;is system T.O. in seconds
        jsr     rldsys bitif   acav, portcp    ;test for ac available
        jp      dec03           ;jmp if no AC
        ld      batcnt,.#min6   ;reset battery timer and don't switch
        ret                     ; if plugged in to AC adapter
dec03:
        ifeq    tdelay, #0      ;don't test batteries until after delay
        jsr     chklow
        drsz    batcnt          ;# of seconds to change batteries
        ret
        jsr     cngbat
        ret                     ; to allow for a skip return if no error
        ret decmin:
        ld      minute, #min1   ;reset the minute counter
        bitif   charge, crgmde  ;are we charging the batteries?
        jmp     tstend          ; if so then check for end, etc.
        bitif   chrgrb, crgmde  ;are we charging the reserve battery?
        jsr     tstres          ; if so then test for -dV ld      a, sysbyt       ;to speed up checks bitif   acav, portcp    ;test for ac available
        jp      min00           ;jmp if no AC
        bitif   acovrd, a       ;test for AC override
        jmp     stmout          ; and reset timeout counters if active
min00:
        bitif   hdsec, a        ;is the hd timeout in seconds?
        jp      min01
        jsr     rldhdc          ;reset the hard disk timeout
min01:
        ld      a, sysbyt       ;to speed up checks
        bitif   lcdsec, a       ;is lcd T.O. in seconds
        jp      min02
        jsr     rldlcd
```

Page A-ix

```
min02:
        ld      a, sysbyt           ;to speed up checks
        bitif   syssec, a           ;is system T.O. in seconds
        ret
        jmp     ridays ;
; The interrupt vector table starts from the lowest priority vector
; which is the VIS default address and goes down to the highest
; priority vector, the software interrupt.
;
        .=01e0
        .addrw  visvec              ;Default VIS routine must not do a RETI
        .addrw  wakeup              ;Port L Wakeup interrupt
        .addrw  reserv              ;Timer 3 this should never occur
        .addrw  reserv              ;Timer 3 this should never occur
        .addrw  time2b
        .addrw  time2a
        .addrw  reserv              ;UART this should never occur
        .addrw  reserv              ;UART this should never occur
        .addrw  reserv              ;TBD this should never occur
        .addrw  microw              ;Microwire BUSY Low
        .addrw  time1b
        .addrw  time1a
        .addrw  timer0              ;Idle timer
        .addrw  extirq              ;Host CPU IRQ (CDONE)
        .addrw  reserv              ;NMI interrupt is reserved
        .addrw  swivec              ;Software interrupt (illegal instruction)
;
; Multi input wake-up/port L interrupt vector
;
wakeup:
        ld      b, #wkpnd
        bitif   bdt, [b]            ;test for battery interrupt
        jsr     resvon              ; switch on the reserve bat
        bitif   bdt, mode           ;if reserve battery active
        jmp     restor              ; then dont check anything else
        bitif   hldreq, mode        ;are we in hold
        jp      wake00              ; then skip some tests
        bitif   vramcs, wkpnd       ;test for activity
        jsr     tstvid
```

Page A-x

```
wake00:
;       bitif   slpmde, mode        ;is the processor asleep?
;       jp      wake01
;       jmp     restor              ; if not then cancel tests
wake01:
        bitif   kbdint, wkpnd       ;exit on keyboard interrupt
        jsr     hidoff              ;***
        bitif   cpuint, wkpnd       ;is cpu interrupt active
        jsr     shrton              ; turn on for 50 usec
        jmp     restor ;
; Default VIS vector
;
visvec:
;       jmp     tog
        jsr     tog1
        jmp     start
;
; Microwire/plus busy low interrupt vector
;
microw:
        rbit    3,lcntrl
        jmp     restor
;
; Timer T2 T2B interrupt vector
;
time2b:
        ld      b, #ophigh
        clrbit  speakr, [b]         ;turn off the speaker
        jsr     puthi
        rbit    1,t2cntrl
        jmp     restor
;
; Timer T2 T2A/underflow interrupt vector
;
time2a:
        ld      b, #ophigh
        setbit  speakr, [b]         ;turn the speaker on
        jsr     puthi
        rbit    3,t2cntrl
```

Page A-xi

```
        jmp     restor
;
; Timer T1 T1B interrupt vector
;
time1b:
        jsr     t1off
        jsr     t2off
        rbit    0, icntrl       ;disable interrupts until the next beep
        rbit    1, icntrl
        jmp     restor
;
; Timer T1 T1A/underflow interrupt vector
;
time1a:
        rbit    5,psw
        jmp     restor tstac:
        bitif   syson, portgp   ;is power good true
        jp      tstflg          ; then make sure we know it
        bitif   syson, flashb   ;power is off, but
        jmp     reset           ; if we're here the cop doesnt know it's off
        ret
tstflg:
        bitif   syson, flashb   ;does the cop know we're on
        ret                     ; yes so just return
        jmp     reset           ; restart if cop thinks we're off cmain:
        bitif   syson, portgp   ;Monitor system switch
        jmp     reset
        bitif   acav, portcp    ;Next test for AC power
        jmp     copoff          ; Stop system if no AC bitif   bdt, portlp     ;test for new battery
        jsr     waitb           ; and start over
        sbit    0, psw          ;global interrupt enable
        nop                     ;service all interrupts now
        nop
        nop
        rbit    0, psw          ; now turn them back off
```

Page A-xii

```
          jp      cmain waitb:
          jsr     acrgof          ;turn off A bat charger
          jsr     bcrgof          ;turn off B bat charger
          jmpl    stcrg1          ;test for new battery and restart if available chklow:
          jsr     avrage          ;use running average for voltages
          bitif   bankb, oplow    ;test for current bank
          jmp     tbmin           ; if bank B
          ld      a, batav        ;get the A bank voltage
          ifgt    a, #vterm       ; and test for cutoff value
          jp      chk00
toolow:
          jsr     cngbat          ;try to change batteries
          nop                     ;**
;         jmp     spmoff          ;kill power if other battery is bad
          jsrl    stndby          ;put system in lowest power mode
          clrbit  kbdint, wken    ; and don't allow keypress to exit
          setbit  lobat3, mode    ;wait 10 sec for new battery or AC
          ld      minute, #min1/6 ;reset the minute counter for termination
          jmp     stbeep          ;beep and prepare to turn off chk00:
          ld      b, #bavmin
          x       a, [b]          ;store the new "minimum"
          ifgt    a, [b]          ;is it really less
          jp      tbmax           ; if so continue
          x       a, [b]          ; else restore the old value
tbmax:
          ld      a, batbv        ;now read bank B's voltage
          ld      b, #bbvmax      ; and look for a maximum
          x       a, [b]          ;store the new maximum
          ifgt    a, [b]          ;is old value greater than new
          x       a, [b]          ; then put it back
tstdlt:
          ld      b, #bavmax      ;point to highest bat A voltage
          ld      a, [b+]
          sc                      ;for subtraction
          subc    a, [b]          ;calculate the delta
```

Page A-xiii

```
        bitif   lobat1, mode    ;are we already in low bat mode
        jp      tstdl2          ; then test for second delta
        ifgt    a, #lb1dlt      ;is it greater than cutoff?
        jp      lowbt1          ;then warn user
        ld      a, [b+]         ; otherwise increment b
        ld      a, [b+]         ;to test bank B
        sc
        subc    a, [b]
        ifgt    a, #lb1dlt
        jp      lowbt1
        ret tstdl2:
        ifgt    a, #lb2dlt      ;is it greater than cutoff?
        jp      lowbt2          ;then warn user
        ld      a, [b+]         ; otherwise increment b
        ld      a, [b+]         ;to test bank B
        sc
        subc    a, [b]
        ifgt    a, #lb2dlt
        jp      lowbt2
        ret lowbt1:
        setbit  lobat1, mode
        ld      b, #oplow
        setbit  lowbat, [b]     ;turn on the low bat LED
        jmp     putlow lowbt2:
        bitif   lobat2, mode    ;are we already in lobat2 mode
        ret                     ;then just return
        setbit  lobat2, mode
        jsrl    stndby
        ld      avcnst, #1      ;to start flashing
        ret tbmin:
        ld      a, batbv        ;get the B bank voltage
        ifgt    a, #vterm       ; and test for cutoff value
```

Page A-xiv

```
        jp      chk01
        jmp     toolow chk01:
        ld      b, #bbvmin
        x       a, [b]          ;store the new "minimum"
        ifgt    a, [b]          ;is it really less
        jp      tamax           ; if so continue
        x       a, [b]          ; else restore the old value
tamax:
        ld      a, betav        ;now read bank A's voltage
        ld      b, #bevmax      ; and look for a maximum
        x       a, [b]          ;store the new maximum
        ifgt    a, [b]          ;is old value greater than new
        x       a, [b]          ; then put it back
        jmp     tstdlt          ;test for delta V readan:
        ld      enad, #04       ;setup to read battery A's voltage
        nop                     ;Time delay to complete conversion
        nop
        nop
        nop
getrdg:
        nop
        nop
        nop
        nop
        nop
        ld      a, adrslt       ;read A/D
        ld      enad, #0        ;Put A/D in low power mode
        ret readbn:
        ld      enad, #044      ;setup to read battery B's voltage
        jp      getrdg          ;takes 3 clock cycles ; CHKBAT determines which battery is currently selected and then reads
; the battery voltage. The voltage is returned in A. No other registers
; are disturbed.

chkbat:
```

Page A-xv

```
          ld      a, #04          ;set single & divide by 6
          bitif   bankb, oplow    ;if on bank B
          or      a, #060         ; setup to read battery B's voltage
          x       a, enad         ;and enable A/D converter
          nop                     ;Time delay to complete conversion
          nop
          nop
          nop
          nop
          nop
          nop
          nop
          ld      a, adrslt       ;read A/D
          ld      enad, #0        ;Put A/D in low power mode
          ret reslop:
          sbit    0, psw          ;global interrupt enable
          nop                     ;service all interrupts now
          nop
          nop
          rbit    0, psw          ; now turn them back off
          bitif   acav, portcp   ;test for AC adapter
          jp      res00           ; if operating from batteries
          jsr     tstn03          ;reenable normal operation
          jmp     main
res00:
          bitif   bdt, mode       ;wait for bdt to clear
          jp      reslop          ; until battery inserted
          ifeq    tdelay, #0
          jp      res01
          jmp     reslop          ;wait before measuring batteries
res01:
          jsr     tbgood          ;next test for good battery
          jp      nogood
          jmp     main            ;start over with good battery nogood:
          setbit  lobat3, mode    ;wait 10 sec for new battery or AC
          ld      minute, #min1/6 ;reset the minute counter for termination
```

Page A-xvi

```
        jsr     stbeep          ;beep and prepare to turn off
        jmp     main lo3lop:
        bitif   acav, portcp    ;test for AC adapter
        jp      lo300           ; until AC plugged in
        jsr     tstn03          ;reenable normal operation
        jmp     main
lo300:
        bitif   bdt, mode       ;check for battery presence &
        jmp     main
        jp      lo3lop          ; wait until battery removed or AC plugged in clrlob:
        jsr     lblof0
        ld      b, mode         ;This is the same number of bytes and one
        bitif   lobat3, [b]     ; less clock than testing mode directly
        jsr     hldoff
        ld      b, mode
        bitif   lobat2, [b]
        jsr     hldoff
        ld      b, mode
        clrbit  lobat3, [b]
        clrbit  lobat2, [b]
        clrbit  lobat1, [b]
        ret ; TSTPOA tests to see if the case is closed and flashes led's or beeps
; accordingly.

tstpoa:
        ld      a, alrmct       ;get number of seconds switch is down
        ifgt    a, #poasec      ;more than 5 seconds
        jp      closed          ; then case must be closed
        inc     a
        x       a, alrmct       ;increment count
        ret closed:
        setbit  pos, flashb     ;set case closed flag
```

Page A-xvii

```
        bitif   $cav, portcp    ;test for ac available
        jp      clos00          ; continue if no AC
        jsr     dspof0          ;turn off LCD if case closed,
        clrbit  posbep, flashb  ; but no alarm if AC present
        ret
clos00:
        bitif   crton, flashb   ;is the crt in use
        ret                     ; then don't beep
        bitif   posbep, flashb
        ret                     ;if already in standby, don't do it again
        jsrl    stndby          ;put system in standby mode and
        setbit  posbep, flashb  ; if on batteries then beep
        jsr     stbeep
        ret clrbdt:
        clrbit  bdt, wkpnd      ;make sure interrupt is clear clrbsy:
        ld      b, $oplow       ; clear io latch
        setbit  csclr, [b]      ; first write bit high
        jsr     putlow
        ld      b, $oplow
        clrbit  csclr, [b]      ; and then low again
        jmp     putlow stmout:
        ld      b, #syscnt
        ld      x, #systim
        ld      cnt, #3
initl:
        ld      a, [x+]         ;set the initial timeouts
        x       a, [b+]
        drsz    cnt
        jp      initl
        ret dlypmd:
        ld      tdelay, #200    ;delay 1 second for battery to stabalize
rstpmd:
        jsr     vinit
```

Page A-xviii

```
        ld      a, batav
        ld      b, #bavmax          ;point to start of table
        x       a, [b]              ; and set max and min to current
        ld      a, [b+]             ; readings
        x       a, [b+]
        ld      a, batbv
        x       a, [b]
        ld      a, [b+]
        x       a, [b]
        ret vinit:
        jsr     readed              ;setup the running average array
        jsr     readed              ; this is slower than doing only
        jsr     readed              ; the readings we need, but we only
        jsr     readed              ; do it once in a while
        jsr     readed
        jsr     readed
        jsr     readed
        jsr     readed
        jmp     avrage reset:
        ld      psw, #0             ;turn off all potential interrupts
        ld      icntrl, #0
        ld      cntrl, #0
        ld      t2cntrl, #0
;       jsr     dspsp               ;** debug
        ld      sp, #06F
        jmp     start ; REFRSH will output a stream of refresh pulses every 5.12 msec when
; the COP has the cpu in hold
;

refrsh:
        ld      b, #portcd
        setbit  rfresh, [b]
        setbit  rfresh, portcc      ;enable output only during refresh
        ld      cnt, #41            ;to average 1 refresh every 125 usec.
        bitif   s386, sysbyt        ; different refresh for 286 then 386
```

Page A-xix

```
        jp      reflop          ; do 386 refresh
ref286:
        clrbit  rfresh, [b]     ; otherwise do 286
        jsr     delay1          ;to make 13.75 usec pulse
        nop                     ; stretch it out to 20 usec.
        nop
        nop
        nop
        nop
        setbit  rfresh, [b]
        jsr     delay1          ;to make 22.5 usec delay before next pulse
        drsz    cnt
        jp      ref286
        jp      refext          ;to turn off portc reflop:
        clrbit  rfresh, [b]
        nop                     ;to make 2.5 usec pulse
        nop                     ;one more for good measure
        setbit  rfresh, [b]
        drsz    cnt
        jp      reflop
refext:
        clrbit  rfresh, portcc  ;disable as soon as refresh is done
        clrbit  rfresh, [b]
        rat dsplon:
        clrbit  crton, flashb   ;indicate lcd active
dspon0:
        clrbit  vramcs, wken    ;disable wakeup on video activity
        clrbit  vramcs, wkpnd
        ld      b, floplow      ;now the low byte
        setbit  vddon, [b]      ; to turn on the +5v to the LCD
        setbit  lcdon, [b]      ; to turn on the backlight inverter
        jp      putlow          ;do it and return to caller ; HSPEED and LSPEED are used to switch the processor speed by
; toggling the HIGHSPEED* line (OP 13) on MILES hspeed:
```

Page A-xx

```
        ld     b, #ophigh         ; point to contents of OP high byte
        clrbit hispd, [b]         ; low for max clock speed
        jp     puthi              ; output to OP register lspeed:
        ld     b, #ophigh         ; point to contents of OP high byte
        setbit hispd, [b]         ; set bit high for 1/2 clock speed
        jp     puthi              ; output to OP register dsplof:
        setbit crton, flashb      ;indicate crt active
dspof0:
        ld     b, #oplow          ;set the OP low byte
        clrbit lcdon, [b]         ; to turn off the backlight inverter
        clrbit vddon, [b]         ; to turn off the +5v to the LCD
;       jp     putlow             ; before the LCD controller ;
;       PUTLOW / PUTHI
;
; These routines write a byte pointed to by the B register to the MILES
; OP Low byte or OP High byte registers respectively
;
putlow:
        clrbit milsad, portcd     ;C0 = 0
        jp     put
puthi:
        setbit milsad, portcd     ;C0 = 1
put:
        ld     a, [b]
        x      a, portd           ;put the value in port D
        ld     b, #portcd         ;point to port C for faster access
        setbit milstb, [b]        ;toggle c1 to a 1
        clrbit milstb, [b]        ;reset to 0 to latch data
;       pop    a                  ;recover the flags
;       x      a, psw             ; and restore them
        ret ;
; MLDOFF restores the processor to full speed operation
;
```

Page A-xxi

```
hldoff:
        bitif   hldreq, mode        ;Are we in hold mode?
        jp      hld00               ; yes then turn cpu back on
        jp      hld01               ; no then just exit sleep
; first set IO_M~ to IO in OPN
hld00:
        ld      b, #ophigh          ;point to the op register data storage
        setbit  iom, [b]            ; 0 port data = 10000000 for IO
        jsr     puthi ld      b, #oplow           ;restore normal value
        clrbit  drq5, [b]
        clrbit  master, [b]
        jsr     putlow
        clrbit  hldreq, mode        ;clear the flag
hld01:
        jsrl    c20on               ;turn on the crt controller
        bitif   pos, flashb         ;don't turn on if case closed
        jp      hld00
        bitif   crton, flashb       ; or the crt is active
        jp      hld02
        jsr     depon0              ;turn on the display
hld02:
        jsrl    endslp              ;exit sleep mode
        bitif   charge, crgmde ;**  ;are we charging
        jp      hld03
        jsr     stmout              ;reload the timeout counters
hld03:
        clrbit  pwrled, portcd     ;turn the power/standby led on
        clrbit  kbdint, wkpnd      ;clear keyboard interrupt
        clrbit  kbdint, wken       ;turn off wakeup enable **********
        clrbit  cpuint, wken
        clrbit  cpuint, wkpnd
; now set IO_M~ to M in OPN
        ld      b, #ophigh          ;point to the op register data storage
        clrbit  iom, [b]            ;point to memory
        jmp     puthi               ; and return ;
; RESVON turns on the reserve battery if the main battery is removed
;       On Entry  B points to WKPND
```

Page A-xxi

```
;
resvon:
        bitif   acav, portcp            ;test for ac available
        jp      resv01                  ;only turn on if no AC
        clrbit  bdt, [b]                ;clear the interrupt
        setbit  rbin, portcd            ; make sure the reserve is off ;**
        ret
resv01:
        ld      minute, #min4/2         ;reset the minute counter for termination
        setbit  bdt, mode               ;set flag for new bat test
        clrbit  rbin, portcd            ;turn on reserve battery
        ld      [b], #0                 ;clear all the pending interrupts
        jsrl    stndby                  ;enter standby mode and
        clrbit  kbdint, wken            ; only exit on new battery or acav
;**     setbit  cpuint, wken
;       jsr     retpmd
        ld      b, #ophigh
        clrbit  iom, [b]                ;make sure we're set to memory cycle
        jsr     puthi
        ld      a, #L(aresdi)           ;get # of times reserve has been activated
        jsrl    mle00
        inc     a
        x       a, portd
        except  sramu, sresdi           ;save the count
        ifeq    portd, #0               ;did we wrap
        jsr     incrdi                  ;then increment upper byte
        ld      tdelay, #20             ;debounce delay
        ret ; TSTNEW monitors the bdt line watching for a new battery to be installed tstnew:
        jsr     clrbsy                  ;try to reset bat detect bit
        bitif   acav, portcp            ;did user plug in AC adapter?
        jp      tstn00                  ; no then continue
        jp      tstn01                  ; yes then cancel standby after delay
tstn00:
        bitif   bdt, portlp             ;check for battery presence
        jp      setdly                  ; none yet
tstn01:
        drsz    tdelay                  ;debounce time
```

Page A-xxiii

```
            ret
tstn03:
        setbit  rbin, portcd        ;turn off reserve battery
        jsr     clrlob
        clrbit  bdt, [b]            ;CLRLOB sets B to point to MODE
;**     setbit  kbdint, wken        ; reenable keyboard interrupt
        jsr     dlypmd              ;initialize min and max for new bat
        jmp     hidoff              ;exit standby mode
setdly:
        ld      tdelay, #20         ; 100 msec debounce
        ret ; TBGOOD tests the new battery to see if it is above minimum voltage
; and skips the next instruction on return if the battery is good tbgood:
        bitif   acav, portcp        ;If AC plugged in then
        jp      tbg00
        retsk                       ;always return good
tbg00:
        jsr     chkbat              ;Then test new battery
        bitif   lobat2, mode        ;** possibly eliminate        **
        jp      tbgd2               ;** and require all new to be v+10 **
        ifgt    a, #vterm+1         ; must be above minimum
        retsk jsr     cngbat              ; if not try the other battery
        ret                         ;we can only get here if both
                                    ;banks are bad and no AC is available jsr     chkbat              ;read voltage on second bank
        ifgt    a, #vterm+1         ; above minimum?
        retsk                       ;start over with good battery
        ret tbgd2:
        ifgt    a, #vterm+10        ; allow at least 10 minutes operation
        retsk jsr     cngbat              ; if not try the other battery
        ret                         ;we can only get here if both
```

Page A-xxiv

```
                            ;banks are bad and no AC is available
        jsr     chkbat      ;read voltage on second bank
        ifgt    a, #vterm+10 ; allow at least 10 minutes operation
        retsk               ;start over with good battery
        ret incrdi:
        ld      a, #L(sresdi+1)    ;get # of times reserve has been charged
        jsrl    m1e00
        inc     a
        x       a, portd
        except  srams, sresdi+1    ;save the count
        ret tstvid:
        bitif   vramcs, wken    ;is test for activity enabled?
        jp      vid00
        clrbit  vramcs, wkpnd
        ret                     ; if not active
vid00:
        bitif   hldreq, mode    ;are we in standby mode
        ret                     ; if so then return
        bitif   crton, flashb
        jp      rstlcd
        jsr     dspon0          ;else make sure display is on
        jp      rstlcd rldlcd:
        bitif   vramcs, wkpnd   ;test for activity
        jp      rstlcd          ;if active
        ifeq    lcdcnt, #0      ;no timeouts if zero count
        ret
        bitif   crton, flashb   ;is the LCD or CRT active
        ret                     ; if CRT
        drsz    lcdcnt          ; else decrement counter
        ret                     ; and return
        setbit  vramcs, wken    ;enable wakeup on video activity
        clrbit  kbdint, wkpnd
        setbit  kbdint, wken    ; or a keypress
        jmp     dspof0          ;turn off display backlight & LCD
```

Page A-xxv

```
rstlcd:
        ld      a, lcdtim
        x       a, lcdcnt       ;reset the lcd counter
        clrbit  vramcs, wkpnd
        jp      sysrst ridhdc:
        bitif   hdcs0, wkpnd    ;test for activity on hard disk
        jp      rsthd           ;if there is activity
        ifeq    hdcnt, #0       ;no timeouts if zero count
        ret
        drsz    hdcnt           ; else decrement counter
        ret                     ; and return
        jmpl    drvof1          ;when we decrement to zero
rsthd:
        ld      a, hdtim        ;reset the timeout from system setting
        x       a, hdcnt
        clrbit  hdcs0, wkpnd
sysrst:
        ld      a, systim       ;reset system timeout if anything active
        x       a, syscnt
        clrbit  kbdint, wkpnd
        jmp     clrbsy          ;to clear out I/O activity flag rldsys:
        bitif   kbdint, wkpnd   ;test keyboard
        jp      sysrst
        bitif   ioact, portgp   ;test for any active I/O devices
        jp      sysrst
        ifeq    syscnt, #0      ;no timeouts if zero count
        ret
        drsz    syscnt
        ret                     ;if nothing active
        jsrl    drvof1                  ;turn off the drive
        jsr     dspof0                  ;turn off the display
        setbit  vramcs, wken    ;enable wakeup on video activity
;       setbit  hdcs0, wken     ; or hard disk activity
        jmpl    sleep ; READAD reads the A/D channels and maintains the last 8 values of each
; voltage and charge current in an array starting at location AVSAVE
```

Page A-xxvi

```
readad:
        rc
        ld      enad, #04           ;Single conversion, divide by 6
        ld      b, #enad
        ld      x, #debug           ;use the debug location to pass readings
adloop:
        ld      a, [b]              ;get the enable command
        adc     a, #020             ;bump to the next channel
        x       a, [b+]             ; and start the next conversion
        ld      a, [b-]             ;read the previous result
        x       a, [x+]             ; and store it
        ifnc                        ;test for overflow
        jp      adloop              ; and continue till done
        ld      enad, #0            ;Put A/D in low power mode bitif   charge, crgmde      ;Are we charging the batteries?
        jsr     readv               ; then turn off charge and reread voltage
;       jsr     forcer ; Update arrays with latest readings ld      x, #debug           ;address of A/D value array
        ld      b, #avsave          ;pointer to 1st element for A Batt
        ld      cnt, #5
update:
        ld      a, [x+]             ;get a reading
        jsr     rotate              ; and add it to the array
        drsz    cnt
        jp      update
        ld      cnt, #3             ;now do the discharge currents
        ld      b, #batrc
uploop:
        ld      a, [x+]             ;get the A current
        x       a, [b+]             ; and save it
        drsz    cnt
        jp      uploop
        ret forcer:
        ld      b, #debug
        clr     a
```

Page A-xxvii

```
        ld      cnt, #8
forlop:
        x       a, (b)
        ld      a, (b+)
        inc     a
        drsz    cnt
        jp      forlop
        ret ; AVRAGE averages the last 8 readings for each battery voltage and
;   charge current and stores the 8 bit values in a table
;
avrage:
        ld      x, #avsave          ;point to the first set of 8 readings
        ld      b, #avwork          ;16 bit workspace
        jsr     avr
        x       a, batav            ;average battery A voltage
        jsr     avr
        x       a, bacrg            ;average batt A charge current
        jsr     avr
        x       a, batbv            ;average battery B voltage
        jsr     avr
        x       a, bbcrg            ;average batt B charge current
        jsr     avr
        x       a, batrv            ;average reserve battery voltage
        ret avr:
        clr     a
        x       a, (b+)             ;clear the work area
        clr     a
        x       a, (b-)
        rc
        ld      cnt, #8
avloop:
        ld      a, (x+)             ;get the next reading
        adc     a, (b)              ; and add in the accumulated value
        x       a, (b+)             ; save
        clr     a                   ;get a zero
        adc     a, (b)              ; and add in the carry and clear it
```

Page A-xxviii

```
         x      a, [b-]           ; and save
         drsz   cnt
         jp     avloop ld     cnt, #3           ;setup for the shift operation
         ld     a, [b+]           ;increment b to point to avwork+1
sftlop:
         ld     a, [b]            ;it's more efficient to do it always
         rrc    a                 ; rather than a test and skip
         x      a, [b-]           ;restore the shifted value
         ld     a, [b]            ;now get the LSB
         rrc    a                 ; and shift it as well
         x      a, [b+]
         drsz   cnt
         jp     sftlop            ;three times for divide by 8 ld     a, [b-]           ;point back to avwork
         ld     a, [b]            ;get the average value for return
         ret ; WRITAD returns the A/D values starting at 1F81h
;
;        1F81 - Bank A voltage
;        1F82 - Bank A charge current
;        1F83 - Bank B voltage
;        1F84 - Bank B charge current
;        1F85 - Reserve battery voltage
;        1F86 - Reserve battery discharge current
;        1F87 - Bank A discharge current
;        1F88 - Bank B discharge current writad:
;        ld     b, #batbc         ;point to the data
         ld     b, #debug+7       ;point to the data
         ld     x, #portd writ8p:                           ;write the parameters to SRAM
         ld     a, [b-]           ;get the last parameter
         x      a, [x]
         except sram= 01F88       ; and write in reverse order
         ld     a, [b-]
```

Page A-xxix

```
        x       a, [x]
        except  sram 01F87
        ld      a, [b-]
        x       a, [x]
        except  sram 01F86
        ld      a, [b-]
        x       a, [x]
        except  sram 01F85
writ6p:
        ld      a, [b-]
        x       a, [x]
        except  sram 01F84
        ld      a, [b-]
        x       a, [x]
        except  sram 01F83
        ld      a, [b-]
        x       a, [x]
        except  sram 01F82
        ld      a, [b]
        x       a, [x]
        except  sram 01F81
        ret
```

; READY momentairly turns off the charger and rereads the battery voltages

```
ready:
        bitif   chrgb, crgmde           ;is timer 1 on?
        jsr     t1off
        bitif   chrga, crgmde           ;test timer 2 also
        jsr     t2off
        bitif   chrgrb, crgmde          ;is reserve battery being charged?
        jsr     rbcoff
        ld      enad, #04               ;start voltage reading for A batt
        ld      b, #enad
        ld      x, #debug               ;use the debug location to pass readings
        ld      a, [b]                  ;get the enable command
        add     a, #040                 ;bump to the next channel
        x       a, [b+]                 ; and start the next conversion
        ld      a, [b-]                 ;read the previous result
        x       a, [x+]                 ; and store it
        ld      a, [b]                  ;get the enable command
```

Page A-xxx

```
        add     s, #040         ;bump to the next channel
        x       a, [b+]         ; and start the next conversion
        ld      a, [x+]         ;bump x to point to b channel
        ld      a, [b]          ;get the B reading
        x       a, [x+]         ;and replace the old value
        ld      a, [x+]         ;bump the pointer
        ld      a, [b]          ;read the reserve result
        x       a, [x]          ; and save it
        ld      enad, #0        ;Put A/D in low power mode ld      b, #crgmde
        bitif   chrgb, [b]      ;was bank B charging?
        setbit  txc0, cntrl     ; if so then reenable
        bitif   chrga, [b]      ;How about bank A
        setbit  txc0, t2cntrl
        bitif   chrgrb, [b]     ;Finally test the reserve battery
        jsr     rbcon
        ret t1off:
        ld      b, #portgd
        clrbit  txc0, cntrl     ;turn off timer
        setbit  chrgb, [b]      ; then make sure output is high
        ld      b, #tmr1lo      ;clear out the timer to avoid
        ld      [b+], #0        ; phase shifts
        ld      [b], #0
        ret t2off:
        ld      b, #portld
        clrbit  txc0, t2cntrl   ;turn off timer
        setbit  chrga, [b]      ; then make sure output is high
        ld      b, #tmr2lo      ;clear out the timer to avoid
        ld      [b+], #0        ; phase shifts
        ld      [b], #0
        ld      b, #ophigh      ;make sure the speaker is also off
        clrbit  speakr, [b]
        jmp     puthi rbcend:
        clrbit  chrgrb, crgmde
```

Page A-xxx

```
rbcoff:
        ld      b, #oplow               ;point to OP low save byte
        clrbit  chrgrb, [b]             ;turn off the Res batt charger
        jmp     putlow rbstrt:
        ld      b, #ophigh
        clrbit  iom, [b]                ;make sure we're set to memory cycle
        jsr     puthi
        ld      a, #L(srescr)           ;get # of times reserve has been charged
        jsrl    m1e00
        inc     a
        x       a, portd
        except  sramw, srescr           ;save the count
        ifeq    portd, #0               ;did we wrap
        jsr     incrcr                  ;then increment upper byte
        setbit  chrgrb, crgmde
        jsrl    clroid
        ld      brvmax, #0              ;clear peak reading
rbcon:
        ld      b, #oplow
        setbit  chrgrb, [b]             ;turn on the reserve batt charger
        jmp     putlow incrcr:
        ld      a, #L(srescr+1)         ;get # of times reserve has been charged
        jsrl    m1e00
        inc     a
        x       a, portd
        except  sramw, srescr+1         ;save the count
        ret incrti:
        ld      a, #L(sresti)           ;reserve operation time
        jsrl    m1e00
        ifgt    a, #mint                ;max time
        ret
        inc     a
        x       a, portd
        except  sramw, sresti           ;save the new time
        ret
```

Page A-xxxii

```
; ROTATE stores the last 8 values in an array pointed to by the B register
; these values are used to calculate average voltage and current for the
; battery charge function
;
;       On Entry:
;               A - contains the most recient value read by the A/D
;               B - points to the beginning of the 8 byte array
;       On Exit:
;               A - contains value being discarded
;               B - points to start of the next array rotate:
        x       a, [b+]                 ;Store and increment
        x       a, [b+]
        x       a, [b+]
        x       a, [b+]
        x       a, [b+]
        x       a, [b+]
        x       a, [b+]
        x       a, [b+]
        ret adjcrg:
        bitif   trklec, crgmde          ;are we trickle charging?
        ret                             ; if so just return
        drsz    syscnt                  ;only adjust every 8 seconds
        ret
        ld      syscnt, #8
        jsr     avrage                  ;compute the new averages
        bitif   chrga, crgmde
        jsr     testa
        bitif   chrgb, crgmde
        jsr     testb
;       jsr     dspdc           ;**     ;display duty cycle on smartview
        ret testa:
        ld      a, becrg ifgt    a, #lhchrg              ;compare with desired charge rate
        jp      shortt                  ; if greater test for short
```

Page A-xxxiii

```
        ifgt    a, #ilchrg      ;is charge rate correct?
        ret                     ; yes, then done ld      b, #t2ralo      ;point to timer 2 a reg
        ld      a, [b]          ; and get current setting
        ifeq    a, #maxcrg      ;are we already at maximum
        ret                     ; then stay put
        inc     a               ;bump the charge rate
        x       a, [b+]
        ld      a, [b+]         ;increment to the b register
        ld      a, [b]          ; and get the current setting
        dec     a               ;decrement by one
        x       a, [b]          ; and store it back
        ld      hdcnt, #2       ;force new minimum current
        ret shortt:                         ;test for shorted battery
        ld      a, #vterm       ;check voltage
        ifgt    a, batav        ;is voltage nominal
        jmp     acrgof          ;battery is shorted if less than 7.5v
        ld      b, #t2ralo      ;if not then reduce charge
        ld      a, [b]
        ifgt    a, #mincrg      ;are we above the minimum
        jp      short1
        jmp     acrgof          ;if not then turn off short1:
        dec     a
        x       a, [b+]         ;decrease the on time
        ld      a, [b+]
        ld      a, [b]
        inc     a               ; and increase the off time
        x       a, [b]
        ld      hdcnt, #2       ;wait before next check for -dV
        ret testb:
        ld      a, bbcrg
        ifgt    a, #ihchrg      ;compare with desired charge rate
        jp      shortb          ; if greater test for short
```

Page A-xxxiv

```
        ifgt    -e, #ilchrg     ;is charge rate correct?
        ret                     ; yes, then leave it alone ld      b, #tirslo      ;point to timer 2 a reg
        ld      a, [b]          ; and get current setting
        ifeq    a, #maxcrg      ;are we already at maximum
        ret                     ; then keep constant rate
        inc     a               ;bump the charge rate
        x       a, [b]          ; and store it back
        ld      b, #tirblo      ;point to the b register
        ld      a, [b]          ; and get the current setting
        dec     a               ;decrement by one
        x       a, [b]          ; and store it back
        ld      lcdcnt, #2
        ret shortb:                         ;test for shorted battery
        ld      a, #vterm       ;check voltage
        ifgt    a, batbv        ;is voltage nominal
        jmp     bcrgof          ;battery is shorted if less than 7.5v
        ld      b, #tirslo      ;if not then reduce charge
        ld      a, [b]
        ifgt    a, #mincrg      ;are we above the minimum
        jp      short2
        jmp     bcrgof          ;if not then turn off short2:
        dec     a
        x       a, [b]          ;decrease the on time
        ld      b, #tirblo
        ld      a, [b]
        inc     a               ; and increase the off time
        x       a, [b]
        ld      lcdcnt, #2
        ret tstend:
        drsz    batcnt          ;Maximum charge time
        jp      tst00
        jmp     trickl          ;trickle charge
tst00:
```

Page A-xxxv

```
        bitif   chrga, crgmde
        jsr     testav
        bitif   chrgb, crgmde
        jsr     testbv
        bitif   chrgrb, crgmde
tstr00:
        jsr     testrv
        ld      cnt, #8          ;move last readings to a temp area
        ld      x, #betav
        ld      b, #crgrdg
savlop:
        ld      a, [x+]
        x       a, [b+]
        drsz    cnt
        jp      savlop
        ret tstres:
        jsr     avrage           ;compute average voltage
        jp      tstr00 testav:
        ld      a, crgrdg        ;get old average
        ld      b, #betav
        ifeq    a, [b]           ;are we at a plateu
        jp      vacnst           ; test for timeout
        drsz    hdcnt            ;no -dV after -dPulse width
        jp      tstav0
        ld      hdcnt, #1
        ifgt    a, [b]           ;look for -dV
        jp      acrgof           ; then turn off
tstav0:
        ld      avcnst, #cvtimr  ;voltage changed so reset timer
        ret vacnst:
        ifeq    t2relo, #maxcrg  ;are we at maximum duty cycle?
        jp      testdc           ; then look for +dI
        drsz    avcnst           ;decrement counter
        ret
```

Page A-xxxvi

```
acrgof:
        clrbit  chrge, crgmde       ;tell system we are done
        jsr     t2off               ;turn off the timer
        clrbit  chrge, portlc       ; and timer output bit
        ld      lcdcnt, #2          ;force new minimum current for bank B
        bitif   chrgb, crgmde       ;is bank B still charging
        ret                         ; then leave it alone
        jmp     trickl
;       clrbit  charge, crgmde      ; otherwise reset mode
;       ret testac:
        ld      a, bacrg            ;check the current reading
        ld      b, #baimin          ; and compare with old average
        ifgt    a, crgrdg+1         ;is I increasing
        jp      tstac1              ; then test limits
tstac0:
        x       a, [b]              ;save new minimum if I not increasing
        ret tstac1:
        drsz    hdcnt               ;don't allow test for 1 min after max
        jp      tstac0              ; force new minimum
        ld      hdcnt, #1           ;once here, always here
        sc                          ;clear borrow for subtraction
        subc    a, [b]              ;find the delta I
        ifgt    a, #deltai          ; cutoff if +dI > 12ma.
        jmp     acrgof
        ret testbv:
        ld      a, crgrdg+2         ;get old average
        ld      b, #batbv
        ifeq    a, [b]              ;are we at a plateu
        jp      vbcnst              ; test for timeout
        drsz    lcdcnt
        jp      tstbv0
        ld      lcdcnt, #1
        ifgt    a, [b]              ;look for -dV
        jp      bcrgof              ; then turn off
tstbv0:
```

Page A-xxxvii

```
            ld      -bvcnst, #cvtimr   ;voltage changed so reset timer
            ret vbcnst:
            ifeq    tiralo, #maxcrg
            jp      testbc             ;look for +dI
            drsz    bvcnst             ;decrement counter
            ret bcrgof:
            clrbit  chrgb, crgmde      ;tell system we are done
            jsr     tioff              ;turn off the timer
            clrbit  chrgb, portgc      ; and the output bit
            ld      hdcnt, #2          ;force new minimum current for bank A
            bitif   chrga, crgmde      ;is bank A still charging
            ret                        ; then leave it alone
            jmp     trickl
;           clrbit  charge, crgmde     ; otherwise reset mode
;           ret testbc:
            ld      a, bbcrg           ;check the current reading
            ld      b, #bbimin         ; and compare with old average
            ifgt    a, crgrdg+3        ;is I increasing
            jp      tstbc1
tstbc0:
            x       a, (b)
            ret tstbc1:
            drsz    lcdcnt             ;delay test until current is stable
            jp      tstbc0
            ld      lcdcnt, #1
            sc
            subc    a, (b)
            ifgt    a,#deltai
            jmp     bcrgof             ; then turn off charge
            ret testrv:
;           jsr     dsprv              ;**    Display V on smartview
```

Page A-xxxviii

```
            ld      a, batrv         ;get most recent reading
            ld      b, #brvmax       ;point to stored maximum
            x       a, [b]           ; save new maximum?
            ifgt    a, [b]           ;has V decreased
            jp      rbcext           ; then turn off charge
            ret                      ; otherwise just return rbcext:
            ld      b, #ophigh
            clrbit  iom, [b]         ;make sure we're set to memory cycle
            jsr     puthi
            ld      portd, #0
            except  srmu, sresti     ;reset reserve usage time
            jmp     rbcend dspcg:
            ld      a, portcd        ;port c data
            jsr     makhex
            jsr     smrtlo           ;output to lower 2 bytes
            ld      a, portgp        ; and port g data
            jsr     makhex
            jmp     smrthi           ;upper 2 bytes dspsp:
            ld      a, sp            ;stack pointer
            jsr     makhex
            jsr     smrtlo           ;output to lower 2 bytes
            ld      b, #avwork
            ld      [b+], #070       ;'p'
            ld      [b], #073        ;'s'
            jmp     smrthi           ;upper 2 bytes dsprv:
            ld      a, batrv
            jsr     makhex
            jsr     smrtlo           ;output to lower 2 bytes
            ld      a, brvmax
            jsr     makhex
            jmp     smrthi           ;upper 2 bytes dspdc:
```

Page A-1

```
        jsr     T2off           ;make sure charger is off completly
        clrbit  chrge, portlc   ; so we can use this timer
        jsr     t1off           ;this timer is duration
        clrbit  chrgb, portgc
        ld      b, #t2relo      ;point to timer reload registers
        ld      [b+], #L(beepct-1)
        ld      [b+], #H(beepct-1)
        ld      [b+], #L(beepct-1)
        ld      [b], #H(beepct-1)
        ld      b, #t1relo
        ld      [b+], #L(btime)
        ld      [b], #H(btime)
        ld      t2cntrl, #095   ;start the timer
        ld      cntrl, #090
        rbit    1, icntrl       ;clear the pending flag
        sbit    0, icntrl       ; and enable the interrupt
        ret ckrbat:
        ld      a, #084         ;read rbat voltage
        x       a, enad         ;start the conversion
        ld      a, #L(sresti)   ;get rbat operation time
        jsrl    m1e00
        ifgt    a, #min4/4      ;charge if used for more than 1 minute
        jp      ckac            ;charge reserve battery if ac available
ckr00:
        ld      a, adrslt       ;get the reserve voltage
        ld      enad, #0        ;Put A/D in low power mode
        ifgt    a, #vrmin       ;test for minimum allowed voltage
        ret
crgrbt:
        jmp     rbstrt ckac:
        ld      enad, #0        ;Put A/D in low power mode
        bitif   acav, portcp    ;Next test for AC power
        jp      ck2min          ;2 minutes operation before charg from bat
        jp      crgrbt
ck2min:
        ifgt    a, #min4/2      ;if more than 2 minutes
        jp      crgrbt          ; charge even if no AC
```

Page A-li

```
        jp      ckr00                   ; otherwise check voltage

; CKSRAM will look for a A5h at address 1E02 to indicate that the SRAM
; data has been initialized. If it does not find the A5h it will clear
; the area between 1E02 and 1EFF, and then store an A5 at 1E02.

cksram:
        ld      a, #L(sinitf)           ;get lower byte of address
        jsrl    m1e00
        ifeq    a, #0A5
        ret
        ld      b, #ophigh
        ctrbit  iom, (b)                ;make sure we're set to memory cycle
        jsr     puthi
        ld      portd, #0
        except  sram, sresti
        except  sram, srescr
        except  sram, srescr+1
        except  sram, sreadi
        except  sram, sreadi+1
        except  sram, day008
        except  sram, day009
        except  sram, day00A
        except  sram, day00B
        except  sram, day00C
        except  sram, day00D
        except  sram, day00E
        except  sram, day00F
        except  sram, day010
        except  sram, day011
        except  sram, day012
        except  sram, day013
        except  sram, day014
        except  sram, day015
        except  sram, day016
        except  sram, day017
        except  sram, day018
        except  sram, day019
        except  sram, day01A
        except  sram, day01B
```

Page A-lii

```
        except  sramu, dmy01C
        except  sramu, dmy01D
        except  sramu, dmy01E
        except  sramu, dmy01F
        except  sramu, dmy020
        except  sramu, dmy021
        except  sramu, dmy022
        except  sramu, dmy023
        except  sramu, dmy024
        except  sramu, dmy025
        except  sramu, dmy026
        except  sramu, dmy027
        except  sramu, dmy028
        ld      portd, #0FF      ;force initial charge of rbat
        except  sramu, sresti
        ld      portd, #0A5      ;area now initialized
        except  sramu, sinitf
        ret ;
; CHK1ST does a checksum of the first 100h locations in the program.
; This can be extended to check all of program memory by adding a
;       LAID
;       RET
; to every 100h block of memory, and then looping through each call
; 100h times as below.
;
chk1st:
        ld      cnt, #0          ;loop counter (must be a register)
        ld      ckadr, #0        ;address in the block
        ld      ckdata, #0AA     ;seed for checksum
ckloop:
        ld      a, ckadr         ;get the current address to check
        inc     a                ;increment for next time
        x       a, ckadr         ;save the incremented value
        jsr     ckem00           ;get the contents from the address in block 0
        add     a, ckdata        ;and add in the running total
        x       a, ckdata        ;store it back
        drsz    cnt              ;do this 256 times
```

Page A-liii

```
        jp      ckloop
        ld      a, ckdata       ;get the checksum
        x       a, portd        ;to report to host
        except  sram, 01f81     ;return checksum as 1st parameter
        ret ;This is a routine to test I/O writes to the host processor bus ;  The X register is used to point to the Data to be output
;  The B register points to Port D during the data transfer iow080:
; first set IO_M to 10 in OPH
        ld      b, #ophigh      ;point to the op register data storage
        setbit  iom, [b]        ; D port data = 10000000 for IO
        jsr     puthi ld      x, #temp        ;pointer for data to be output ; next, set up DRQ5 in OPL
        ld      a, oplow        ;get the op register data
        x       a, portd        ; so we can retreive this later
        ld      a, portd        ; emulate a store instruction
        or      a, #drq5        ;set the drq5 bit in the register save data
        x       a, portd        ; D port data = 00000001 for DRQ5
        ld      b, #portcd
        clrbit  milsad, [b]     ; C0 = 0
        setbit  milstb, [b]     ; C1 = 1 (this starts the DREQ cycle)

; now look for OACK ckdack

; next, pull master high in OPL
        ld      b, #portd
        setbit  master, [b]     ; D port data = 00000011 for master*
        clrbit  milstb, portcd  ; close the OP Low register ; write desired data to D port
        x       a, [x]          ;recover the data to output
        x       a, [b]          ; and store it in port D
```

Page A-liv

```
; execute the IO write exception cycle to port 80h
        except  iow, 080 x       a, [b]              ;recover data
        x       a, [x]              ;and return to temp while recovering A ; clear DRQ and master"
        x       a, [b]              ; A contains the original OP Low value
        ld      b, #portcd          ; point back to port C
        setbit  milstb, [b]         ; turn off master mode
        clrbit  milstb, [b]

; now set IO_M" to M in OPM
        ld      b, #ophigh          ;point to the op register data storage
        clrbit  iom, [b]            ;point to memory
        jmp     puthi               ; and return ;
;****************************************************
;       Instruction set checkout
;****************************************************
instst: ld      erc,#0   ;initialize error reference counter
;
; Section 1 - load memory locations with addresses.
;       This section utilizes all variations of the
;       load and exchange instructions.
;       Memory locations 010-01f are loaded with
;       their respective addresses.
;
        ld      010,#010
        ld      011,#011
        ld      b,#012
        ld      a,b
        x       a,[b]
        ld      a,[b+]
        inca
        x       a,[b+]
        ld      [b+],#014
        ld      [b],#015
        ld      A,#00A
        add     a,b
```

Page A-lv

```
        ld      b,#01f
        x       a,(b)
        ld      a,(b-)
        deca
        x       a,(b)
        ld      a,(b)
        deca
        x       a,b
        ld      a,b
        x       a,(b-)
        ld      (b-),#01c
        ld      (b-),#01b
        ld      x,#01a
        ld      a,x
        x       a,(x)
        ld      a,(x-)
        deca
        x       a,(x-)
        ld      a,#002
        x       a,x
        sc
        subc    a,x
        rc
        x       a,x
        ld      a,x
        x       a,(x)
        ld      a,(x+)
        inca
        x       a,(x+)
        ld      a,#018
        x       a,(x+)
        ld      a,(x)
        ifeq    a,#019   ;result=019?
        sc
        drsz    erc
        ifnc
;       jmp     er1
;
er1:    jsr     atoc
e1:     jp      e1
er4:    jsr     atoc
```

Page A-lvi

```
e4:     jp   e4
er5:    jsr  atoc
e5:     jp   e5
er8:    jsr  atoc
e8:     jp   e8
er9:    jsr  atoc
e9:     jp   e9
er10:   jsr  atoc
e10:    jp   e10
er11:   jsr  atoc
e11:    jp   e11
er12:   jsr  atoc
e12:    jp   e12
er13:   jsr  atoc
e13:    jp   e13
er14:   jsr  atoc
e14:    jp   e14
        nop
er15:   jsr  atoc
e15:    jp   e15
er16:   jsr  atoc
e16:    jp   e16
er17:   jsr  atoc
e17:    jp   e17
er18:   jsr  atoc
e18:    jp   e18
er19:   jsr  atoc
e19:    jp   e19
er20:   jsr  atoc
e20:    jp   e20
er21:   jsr  atoc
e21:    jp   e21
er22:   jsr  atoc
e22:    jp   e22
er23:   jsr  atoc
e23:    jp   e23
er24:   jsr  atoc
e24:    jp   e24
er25:   jsr  atoc
e25:    jp   e25
er26:   jsr  atoc
```

Page A-lvii

```
e26:    jp      e26
er27:   jsr     atoc
e27:    jp      e27
er28:   jsr     atoc
e28:    jp      e28
er29:   jsr     atoc
e29:    jp      e29
er30:   jsr     atoc
e30:    jp      e30
er31:   jsr     atoc
e31:    jp      e31
er32:   jsr     atoc
e32:    jp      e32
;
; Error subroutine - Error number output to port 80h
;                    Error data stored in SRAM at 1FC0h
;
Atoc:
        x       a, portd        ;setup error data
        except  sram, 01FC0     ; and store in SRAM
        ld      a,erc           ;output error #
        x       a,temp          ; to port 80h
        jmp     iow080
;
;
; Section 13 - Multiply (16 x 16)
;
msetup: drsz    erc
        drsz    erc
        drsz    erc
        drsz    erc
        ld      a,#0cb
        ld      b,#0
        x       a,(b)
        ld      a,(b)
        ld      b,#3
        x       a,(b)
        ld      a,(b-1
        swap    a
        x       a,(b)
        ld      a,(b-1
```

Page A-lviii

```
        x       a,(b)
        jsr     mult
        drsz    erc
        ld      a,(b-1)
        ifeq    a,#096
        jp      byp26
er49:   jsr     atoc
e49:    jp      e49
byp26:  drsz    erc
        ld      a,(b-1)
        ifeq    a,#03f
        jp      byp27
er50:   jsr     atoc
e50:    jp      e50
byp27:  drsz    erc
        ld      a,(b-1)
        ifeq    a,#09e
        jp      byp28
er51:   jsr     atoc
e51:    jp      e51
byp28:  drsz    erc
        ld      a,(b)
        ifeq    a,#014
        jp      nuinst
er52:   jsr     atoc
e52:    jp      e52
;
; Section 14 - Check new instructions
;
er53:   jsr     atoc
e53:    jp      e53
er54:   jsr     atoc
e54:    jp      e54
er55:   jsr     atoc
e55:    jp      e55
er56:   jsr     atoc
e56:    jp      e56 nuinst: ld      b,#0b
        ld      a,#0a
```

Page A-lix

```
;
; COP 800 (16 x 16) multiply routine
;       Multiplicand in (1,0) multiplier in (3,2)
;       product in (5,4,3,2)
;
        cntr = 0f0
mult:   ld      cntr,#17
        ld      b,#4
        ld      [b+],#0
        ld      [b],#0
        ld      x,#0
        rc
mloop:  ld      a,[b]
        rrc     a
        x       a,[b-]
        ld      a,[b]
        rrc     a
        x       a,[b-]
        ld      a,[b]
        rrc     a
        x       a,[b-]
        ld      a,[b]
        rrc     a
        x       a,[b]
        ld      b,#5
        ifnc
        jp      test
        rc
        ld      b,#4
        ld      a,[x+]
        adc     a,[b]
        x       a,[b+]
        ld      a,[x-]
        adc     a,[b]
        x       a,[b]
test:   drsz    cntr
        jp      mloop
        ret tog:
        ld      b, #oplow
```

Page A-lx

```
        setbit  lowbat, [b]         ;turn on the low batt LED
        jsr     putlow
        ld      b, #portcd
        clrbit  crgled, [b]         ; also the charge LED
        clrbit  pwrled, [b]         ; and the power LED
        ret tog1:
        ld      b, #oplow
        clrbit  lowbat, [b]         ;turn off the low batt LED
        jsr     putlow
        ld      b, #portcd
        clrbit  crgled, [b]         ; turn the charge LED on
        clrbit  pwrled, [b]         ; and the power LED on
        ret ;
; Enter halt mode with A/D conversion started
;
atod6:  ld      ened,#0c
        nop
        nop
        nop
;       sbit    7,portgd
;
; Halt test to measure halt current
;
halt:   nop
;       sbit    7,portgd
        nop
        ret .=0C00                      ; SRAM address for ports 02 - FFh ; This routine will allow the COP to read I/O ports between it's ending
; address and 0FFh. The routine is called with A = L(port address)

ior000:
        laid                        ;read data out of SRAM
        ret
```

Page A-lxi

```
        .=0D00                          ; SRAM address for ports 102 - 1FFh

; This routine will allow the COP to read I/O ports between it's ending
; address and 01FFh. The routine is called with A = L(port address)

ior100:
        laid                            ;read data out of SRAM
        ret .=0E00                          ; SRAM address for ports 202 - 2FFh ; This routine will allow the COP to read I/O ports between it's ending
; address and 02FFh. The routine is called with A = L(port address)

ior200:
        laid                            ;read data out of SRAM
        ret .=0F00                          ; SRAM address for ports 302 - 3FFh ; This routine will allow the COP to read I/O ports between it's ending
; address and 03FFh. The routine is called with A = L(port address)

ior300:
        laid                            ;read data out of SRAM
        ret

.=01000

;
; External interrupt G0 interrupt vector
;
extirq:
        jsr     getcmd          ;read the command from SRAM
        jsr     dispch          ;decode and execute
        ld      b, #ophigh
        clrbit  iom, [b]        ;make sure we're set to memory for CDONE
        jsrl    puthi
        rbit    3,psw
        except  scdone, 0       ; set CDONE for the host
        jmpl    restor
```

Page A-lxi

```
dispch:
        add     a, #L(tblbeg)
        ifgt    a, #L(tblend)
        jp      cmderr              ;invalid command
        jid cmderr:
        ld      portd, #0ff         ;indicate command error
        except  sramw, 01f80        ;replace original command
        ret tblbeg:
        .addr   cksum               ; 0 - Checksum SRAM
        .addr   slftst              ; 1 - Initiate self test
        .addr   togbat              ; 2 - Switch batteries
        .addr   sbatA               ; 3 - Select battery A
        .addr   sbatB               ; 4 - Select battery B
        .addr   sbatR               ; 5 - Select reserve battery
        .addr   dsbatR              ; 6 - Deselect reserve battery
        .addr   dspon               ; 7 - Turn on backlight and display
        .addr   dspoff              ; 8 - Turn off backlight and display
        .addr   batst               ; 9 - Return battery status
        .addr   sleep               ; A - Enter sleep mode
        .addr   endslp              ; B - Exit sleep mode
        .addr   slwclk              ; C - Enter slow clock mode
        .addr   fstclk              ; D - Enter fast clock mode
        .addr   stndby              ; E - Enter standby mode
        .addr   purdwn              ; F - Turn off System Power Module
        .addr   acpchk              ;10 - Current AC power & switches check
        .addr   strtpm              ;11 - Start power management
        .addr   drvoff              ;12 - Put hard disk to sleep
        .addr   endpm               ;13 - Stop power management functions
        .addr   c20on               ;14 - Turn on the WD 90C20
        .addr   c20off              ;15 - Turn off the WD 90C20
        .addr   cmderr              ;16 - Dummy entry to reserve space
        .addr   stchrg              ;17 - Start a charge cycle for test
        .addr   outlow              ;18 - Set state of OP Low bits
        .addr   outhi               ;19 - Set state of OP High bits
        .addr   spwmt1              ;1A - Set high/low timer 1
        .addr   spwmt2              ;1B - Set high/low timer 2
tblend:
```

Page A-lxiii

```
        .addr   crgres              ;1C - Charge reserve 0 = off/1 = on

; The following is the actual table of jumps to the various routines.
; This is a rather convoluted way of doing things, but this is the
; simplest indirect jump/dispatch method supported by the COP.
; This entire table starting from the JID instruction above must
; fit in the same 100H page of memory.

cksum:
        jmp     chksum slftst:
        ret
;       jmp     cmderr              ;invalid command sbatA:
        setbit  bankb, oplow        ;make system think it's on bank B
togbat:
        jsrl    cngalt              ;force the change always
        jmp     cmderr
        ld      batcnt, #min4       ; and reset the timeout
        ret sbatB:
        clrbit  bankb, oplow        ;make system think it's on bank A
        jp      togbat sbatR:
        clrbit  rbin, portcd       ;turn on reserve battery
        ret dsbatR:
        setbit  rbin, portcd       ;turn off reserve battery
        ret dspon:
        jmpl    dsplon              ;turn on display and backlight dspoff:
        jmpl    dsplof              ;turn off the display & backlight
```

Page A-lxiv

```
batst:
        jsrl    readed          ;read the A/D channels
;       jsrl    avrage          ;compute the average
        jmpl    writed          ;and return the instantaneous results sleep:
        setbit  slpmde, mode
        ld      a, #0C4         ;250KHz for 286
        bitif   s386, sysbyt    ;is it really a 386
        xor     a, #050         ; if so switch to 2 MHz
        x       a, temp         ;set sleep mode register
        jsr     htctlw          ;write HT21 control and return
        clrbit  kbdint, wkpnd   ;Clear keyboard to start
        setbit  kbdint, wken    ;enable wakeup interrupt
        ret endslp:
        clrbit  slpmde, mode
        ld      temp, #014      ;turn off sleep mode
        jmp     htctlw          ;write HT21 control and return slwclk:
        jmpl    lspeed          ;set the processor speed to low fstclk:
        jmpl    hspeed          ;set the processor speed to high pwrdwn:
        jmpl    spmoff          ;turn off System Power Module acpchk:
        jmp     chkac strtpm:
        ld      cnt, #4         ;4 parameters currently
        jsr     gsparm          ; get the parameters
        jsr     xsump           ;checksum the parameters
        x       a, [x]          ; and store the checksum
        jmpl    stmout          ; then set the timeout values
```

Page A-lxv

```
endpm:          —
        jmp     cmderr          ;invalid command
chksum:
        jmpl    chk1st          ;checksum 1st block of program stndby:
        jsr     chkact          ;see if system currently busy
        jsr     drvoff          ;turn off the drive
        jsrl    dspof0          ;turn off the display
;       bitif   crton, flashb   ;are we using the crt
;       jp      stnd00
        jsr     c20off          ;turn off the 90C20
stnd00:
        jsr     sleep           ;slow the clock
        jsr     cpuhld          ;lowest power mode
        ld      erc, #1         ;setup to flash every two seconds
        ret stchrg:
        jmp     stcrg1 crgres:
        jsr     getip
        ifeq    debug, #0
        jmpl    rbcend
        jmpl    rbstrt outlow:
        jsr     getip           ; get 1 parameter from data area
        ld      a, debug        ; and store it in debug
        ld      b, #oplow
        x       a, [b]
        jmpl    putlow          ; then output to OP Low and return outhi:
        jsr     getip
        ld      a, debug
        ld      b, #ophigh
        x       a, [b]
        jmpl    puthi           ; same as above to OP High
```

Page A-lxvi

```
spwmt1:
        jmp     spwm1x spwmt2:
        jsr     get4p               ;transfer indirect to allow alt entry
spwm2a:
        clrbit  txc0, t2cntrl       ;Make sure we're off to start
        setbit  chrge, portld       ; including the FET control line
        setbit  chrge, portlc       ; make L4 an output
        ld      x, #debug
        ld      b, #t2ratio
        ld      cnt, #4             ;transfer 4 parameters
t2loop:
        ld      a, [x+]
        x       a, [b+]
        drsz    cnt
        jp      t2loop ld      t2cntrl, #080       ;enable pwm mode
        setbit  chrge, crgmde
        ret drvoff:
        jmp     drvof1 chkact:
        ret c20off:
        ld      b, #ophigh          ;point to op high byte
        clrbit  pd9020, [b]         ;turn off the 90C20
        jmpl    puth1               ; after the backlight and return c20on:
        ld      b, #ophigh          ;point to op high byte
        setbit  pd9020, [b]         ;turn on 90C20
        jmpl    puth1               ; before the backlight spwm1x:
        jsr     get4p
spwm1a:
```

Page A-lxvii

```
        clrbit   ~txc0, cntrl           ;turn off the timer
        setbit   chrgb, portgd          ; and force the charger off
        setbit   chrgb, portgc          ; G3 is an output
        ld       x, #debug
        ld       b, #t1relo
        ld       a, [x+]                ;transfer the first 2 parameters
        x        a, [b+]
        ld       a, [x+]
        x        a, [b]
        ld       b, #t1rblo             ;then do the next two
        ld       a, [x+]
        x        a, [b+]
        ld       a, [x]
        x        a, [b]
        ld       cntrl, #080            ; turn on timer
        setbit   chrgb, crgmde
        ret stcrg1:
        bitif    acav, portcp           ;don't try to charge from batteries
        ret
        jsrl     clrbsy                 ;clear battery detect
        bitif    bdt, portlp            ;is there a battery present
        ret                             ; nop if no battery present
        ld       batcnt, #maxctim       ;max charge time = 3 hours
        clrbit   crgled, portcd
        ld       syscnt, #6
        ld       lcdcnt, #1
        ld       hdcnt, #1
        jsr      clrold                 ;clear the peak readings
        clrbit   trklec, crgmde         ;not trickle charge
        setbit   charge, crgmde         ;indicate we're really charging sttrkl:
        ld       b, #debug
        ld       [b+], #mincrg          ;set small duty cycle to start
        ld       [b+], #00
        ld       [b+], #(maxcrg-mincrg)
        ld       [b], #00
        jsr      spwm2a                 ;start Bat A charging
        ld       b, #debug
```

Page A-lxviii

```
        ld      [b+], #mincrg           ;set small duty cycle to start
        ld      [b+], #00
        ld      [b+], #(maxcrg-mincrg)
        ld      [b], #00
        jmp     spamla                  ;start Bat B charging chkac:
        ld      b, #ophigh
        clrbit  iom, [b]
        jsrl    puthi
        jsrl    clrbsy                  ;reset the latch
        ld      a, mode                 ;get the contents of the mode byte
        and     a, #lobat2+lobat3
        swap    a                       ;swap nibbles
        bitif   lobat1, mode
        or      a, #020
        bitif   acav, portcp            ;test for ac available
        jp      chkac1                  ; if AC not avail
        or      a, #acav
chkac1:
        bitif   swx, portgp             ;also check standby switch
        jp      chkac2
        or      a, #swx                 ;if switch is down
chkac2:
        bitif   bdt, portlp
        jp      chkac3
        or      a, #bdt
chkac3:
        x       a, portd                ;put the flags in the D port
        except  sramw, 01F81            ;and write them to SRAM
        ret ; This routine will become master and write the data in TEMP to HT21 ctl reg 5
;
htctlw:

; first set IO_N~ to IO in OPN
        ld      b, #ophigh              ;point to the op register data storage
        setbit  iom, [b]                ; D port data = 10000000 for IO
        jsrl    puthi
```

Page A-xxxix

```
        ld      a, t1ratc       ;on time for bank b
        jsr     makhex
        jsr     smrtlo          ;output to lower 2 bytes
        ld      a, t2ratc       ;on time for bank a
        jsr     makhex
        jmp     smrthi          ;upper 2 bytes makhex:
        ld      b, #avwork      ;point to temp area
        push    a
        jsr     hexnbl          ;convert to hex
        pop     a               ;recover original value
        swap    a               ; and reverse nibbles hexnbl:
        and     a, #0F          ;mask off upper nibble
        add     a, #030
        ifgt    a, #039
        add     a, #07
        x       a, [b+]
        ret ;This is a debug routine to write values to smart view on the host processor bus ;  The X register is used to point to the Data to be output
;  The B register points to Port 0 during the data transfer smrtlo:
; first set IO_N~ to IO in OPH
        ld      b, #ophigh      ;point to the op register data storage
        setbit  iom, [b]        ; 0 port data = 10000000 for IO
        jsr     puthi ld      x, #avwork      ;pointer for data to be output ; next, set up DRQ5 in OPL
        ld      a, oplow        ;get the op register data
        x       a, portd        ; so we can retreive this later
        ld      a, portd        ; emulate a store instruction
        or      a, #drq5        ;set the drq5 bit in the register save data
```

Page A-xi

```
        x       w, portd          ; 0 port data = 00000001 for DRQ5
        ld      b, #portcd
        clrbit  milsad, [b]       ; C0 = 0
        setbit  milstb, [b]       ; C1 = 1 (this starts the DREQ cycle)

; now look for DACK ckdack

; next, pull master high in OPL
        ld      b, #portd         ; point to the D port
        setbit  master, [b]       ; D port data = 00000011 for master*
        clrbit  milstb, portcd    ; close the OP Low register ; write desired data to D port
        x       a, [x+]           ;recover the data to output
        x       a, [b]            ; and store it in port D ; execute the io write exception cycle to port 94h
        except  iow, 094 x       a, [x]            ;get the next byte to output
        x       a, [b]            ; and put it in port D ; execute the io write exception cycle to port 95h
        except  iow, 095

; clear DRQ and master*
        ld      a, oplow
        x       a, [b]            ; A contains the original OP Low value
        ld      b, #portcd        ; point back to port C
        setbit  milstb, [b]       ; turn off master mode
        clrbit  milstb, [b]

; now set IO_M* to M in OPH
        ld      b, #ophigh        ;point to the op register data storage
        clrbit  iom, [b]          ;point to memory
        jmp     puthi             ; and return ;This is a debug routine to write values to smart view on the host processor bus
```

Page A-xli

```
; The X register is used to point to the Data to be output
; The B register points to Port D during the data transfer smrthi:
; first set IO_M~ to IO in OPH
        ld      b, #ophigh          ;point to the op register data storage
        setbit  iom, [b]            ; D port data = 10000000 for IO
        jsr     puthi ld      x, #avwork          ;pointer for data to be output ; next, set up DRQ5 in OPL
        ld      a, oplow            ;get the op register data
        x       a, portd            ; so we can retreive this later
        ld      a, portd            ; emulate a store instruction
        or      a, #drq5            ;set the drq5 bit in the register save data
        x       a, portd            ; D port data = 00000001 for DRQ5
        ld      b, #portcd
        clrbit  milsad, [b]         ; C0 = 0
        setbit  milstb, [b]         ; C1 = 1 (this starts the DREQ cycle)

; now look for DACK ckdack

; next, pull master high in OPL
        ld      b, #portd           ; point to the D port
        setbit  master, [b]         ; D port data = 00000011 for master*
        clrbit  milstb, portcd      ; close the OP low register ; write desired data to D port
        x       a, [x+]             ;recover the data to output
        x       a, [b]              ; and store it in port D ; execute the io write exception cycle to port 96h
        except  iow, 096 x       a, [x]              ;get the next byte to output
        x       a, [b]              ; and put it in port D ; execute the io write exception cycle to port 97h
```

Page A-xliii

```
        except Tow, 097

; clear DRQ and master*
        ld      a, oplow
        x       a, [b]                  ; A contains the original OP Low value
        ld      b, #portcd              ; point back to port C
        setbit  milstb, [b]             ; turn off master mode
        clrbit  milstb, [b]

; now set IO_M" to M in OPW
        ld      b, #ophigh              ;point to the op register data storage
        clrbit  iom, [b]                ;point to memory
        jmp     puthi                   ; and return ; TRICKL puts the system in trickle charge mode trickl:
;       ld      batcnt, #1              ;so we'll come back next time
trklon:
        clrbit  charge, crgmde          ; reset mode
        setbit  crgled, portcd          ;turn off the charge led
        bitif   acav, portcp            ;don't try to charge from batteries
        ret
        jsr     clrbsy                  ;clear battery detect
        bitif   bdt, portlp             ;is there a battery present
        ret                             ; nop if no battery present
        setbit  trklec, crgmde
        jmpl    sttrkl                  ;minimum charge rate trklof:
        clrbit  charge, crgmde          ;make sure no charge active
        clrbit  trklec, crgmde          ;no longer in trickle charge mode
        setbit  crgled, portcd          ;turn off the charge led
        jsr     t1off                   ; so turn off the charge timers
        jsr     t2off
        jmp     dlypmd          ;**     ;initialize min and max ; SHRTON will drop master for a short period of time to allow the cpu to
; service the timer interrupt in order to maintain the DOS/UNIX clock
```

Page A-xliii

```
shrton:
        bitif   hidreq, mode        ;are we in hold currently
        jp      shrt00              ; if so then turn on for a short time
        ret                         ; otherwise just return
shrt00:

;   set IO_M~ to IO in OPH ld      b, #ophigh          ;point to the op register data storage
        setbit  iom, [b]            ; O port data = 10000000 for IO
        setbit  pd9020, [b]         ;turn on 90C20
        jsr     puthi clrbit  cpuint, wkpnd       ;clear the interrupt bit
        ld      b, #oplow
        clrbit  drq5, [b]           ;drop DRQ5
        clrbit  master, [b]         ; and master
        jsr     putlow              ;for a short time
        ld      b, #portip          ;point to the L port
onloop:
        bitif   cpuint, [b]         ;wait for the interrupt to be serviced
        jp      onloop              ; by the host cpu jsr     delay               ; give cpu time to complete interrupt
        ld      b, #oplow
        setbit  drq5, [b]           ;now lets reassert drq, etc
        ld      a, [b]              ;get the op register data
        x       a, portd            ;and write to port d
        setbit  master, [b]         ; set flag while we still point there
        ld      b, #portcd
        clrbit  milsad, [b]         ; C0 = 0
        setbit  milstb, [b]         ; C1 = 1 (this starts the DREQ cycle)

;   now look for DACK ckdack

;   next, pull master high in OPL
        ld      b, #portd           ; point to the 0 port
        setbit  master, [b]         ; D port data = 00000011 for master"
        clrbit  milstb, portcd      ; close the OP Low register
```

Page A-xliv

```
; now set IO_M to M in OPM
        ld      b, #ophigh              ;point to the op register data storage
        clrbit  iom, (b)                ;point to memory
        bitif   crton, flashb           ;are we using the crt
        jp      shrt01                  ; then don't turn video off
        clrbit  pd9020, (b)             ;turn off 90C20
shrt01:
        jmp     puthi                   ; and return ; SPMOFF outputs a active high pulse to kill the system power module.
; This routine does not return, it just loops waiting for power to go away spmoff:
;       jp      copoff
;       jsr     dspop                   ;display stack
;       jp      .                       ;** debug only
        ld      b, #ophigh
        clrbit  dcoff, (b)              ;Start low
        jsr     puthi
        ld      b, #ophigh
        setbit  dcoff, (b)              ;bring it high
        jsr     puthi                   ; and leave it there ; COPOFF turns off the COP by forcing a watchdog error copoff:
        ld      b, #ophigh
        ld      (b), #fetoff            ;high speed, video off
        jsr     puthi                   ;This is to get around powerup
                                        ; problem with MILES ld      b, #oplow
        ld      (b), #0
        jsr     putlow
        setbit  rbin, portcd            ;turn off the reserve battery
        ld      wdcnt, #0               ;invalid data for watchdog to force reset
        jp      .                       ;wait for power to go away
;tstflh:                                ;** DEBUG **
;       ld      b, #oplow
;       jsr     fllbat
;       jsr     dely50
```

Page A-xlv

```
;		jp	-tstflh
;fllbat:
;		bitif	lowbat, (b)
;		jmp	lbloff
;		jmp	lblon

;
; Routine to switch batteries every 4 minutes and
; then reset idle count down timer. Skips next instruction
; after returning if operation is successful
;
cngbat:
		ld	batcnt, #min4
		jsr	tstbat		;make sure other bank is good
		ret
cngalt:
		setbit	cngben, crgmde	;enable change on next timer tick
		clrbit	rbin, portcd	;turn on reserve battery
		clrbit	bdt, wken	;disable battery detect interrupt
		ld	tdelay, #200	;1 sec delay before battery test
		retsk			;pretend we're done docngb:
		setbit	cngoff, crgmde	;enable reserve off on next timer tick
		clrbit	cngben, crgmde	; and don't switch again for a while
		ld	b,#oplow	;point to the op register data storage
		ld	a,#benkb	;set bit to invert
		xor	a,(b)		;invert it
		x	a,(b)		;and store the new value
		jmp	putlow		;set the byte in the NILES OP register reseta:
		ld	a, batev
		x	a, bevmax	;reset maximum on A
		ret resoff:
		clrbit	cngoff, crgmde	;so we won't come here again
		jsr	clrbdt		;reset the battery detect latch
		bitif	bdt, portip	;then check to see if battery really present
		jp	nobat		;if battery just removed
```

Page A-xlvi

```
        setbit  rbin, portcd       ;if good then turn off the reserve
        setbit  bdt, wken          ; and reenable the bdt interrupt
        bitif   bankb, oplow       ;check for current bank
        jp      reseta
        ld      a, batbv
        x       a, bbvmax          ;reset maximum on B
        ret nobat:
        setbit  bdt, wkpnd         ;make sure interrupt is active
        setbit  bdt, wken          ; and reenable the bdt interrupt
        ret                        ; then continue tstbat:
        ld      a, #04             ;set single & divide by 6
        bitif   bankb, oplow       ;if on bank B
        or      a, #040            ; setup to read battery B's voltage
        x       a, enad            ;and enable A/D converter
        ld      a, enad            ; retreive the enable command
        xor     a, #040            ; setup to read the other channel
        nop                        ;Time delay to complete conversion
        nop
        nop
        x       a, enad            ;start the next cycle
        ld      a, adrslt          ; get the previous value
        ld      b, #adrslt         ;delay and setup for compare
        nop
        nop
        nop
        ld      enad, #0           ;Put A/D in low power mode
        ifgt    a, [b]             ;no load V must be greater then loaded V
        ret                        ; or we won't switch
        ifeq    a, [b]             ;equal isn't good enough
        ret
        retsk delay:
        ld      cnt, #45           ;approx 900 usec delay
dellop:
        jsr     delay1             ; 20usec/loop at 8MHz
```

Page A-xlvii

```
        drsz    -cnt
        jp      delloop
        ret delay1:
        ret dely50:
        ld      cnt, #20        ;**10   ;minimum of 51msec delay
        rbit    5, icntrl               ;clear the T0 overflow bit
dely5a:
        ifbit   5, icntrl               ;require 1 full idle period to start
        jp      dely51                  ; before servicing watchdog
        jp      dely5a                  ;loop
dely51:
        rbit    5, icntrl               ;clear the T0 overflow bit
dely52:
        ifbit   5, icntrl               ;wait for it to be set again
        jp      dely53
        jp      dely52                  ;loop
dely53:
        ld      wdcnt, #009     ;service watch dog 2-65K window, clock monitor on
        drsz    cnt                     ;10 timer overflows
        jp      dely51                  ;wait another 5.12msec
        ret ;       TSTSTB tests the standby button to see if the user is requesting
;       standby mode tststb:
        ld      b, #flashb
        bitif   swx, portgp             ;is the standby switch depressed?
        jp      tsts01                  ; low true so, if not pressed, check for release
        bitif   stdeb1, [b]             ;check debounce bit
        jp      tsts00
        setbit  stdeb1, [b]
        ret
tsts00:
        setbit  stdeb2, [b]
        ret
```

Page A-xlviii

```
tsts01:
        bitif   stdeb2, [b]
        jp      tsts02
        clrbit  stdeb1, [b]
        ret
tsts02:
        bitif   hldreq, mode            ;are we already in standby?
        jp      exstby                  ; then exit
        bitif   pos, [b]                ;was the case closed?
        jp      exstby                  ; then don't enter standby when opened
        clrbit  stdeb1, [b]
        clrbit  stdeb2, [b]
        ld      almct, #0               ;switch is up, so clear count
        clrbit  pos, [b]
        bitif   stbyen, sysbyt          ;is the standby switch enabled?
        jmpl    stndby
        ret                             ;otherwise do nothing exstby:
        clrbit  stdeb2, [b]
        clrbit  stdeb1, [b]
        ld      almct, #0               ;switch is up, so clear count
        clrbit  pos, [b]
        clrbit  posbep, [b]
        jsr     hldoff                  ;bring cpu out of hold
        ret ; FLASHP uses the counter ERC to flash the power LED .5 seconds
; on every 2 seconds flashp:
        drsz    erc                     ;test the counter
        ret                             ;until underflow
        bitif   pwrled, portcp          ;test if light is off/on
        jp      pledon                  ;if off then turn on
        bitif   posbep, flashb          ;should we beep
        jsr     stbeep
        setbit  pwrled, portcd          ;turn led off
        ld      erc, #0                 ;off for approx 1.3 seconds
        bitif   lobat2, mode
        ret                             ;don't affect low bat led
```

Page A-xlix

```
        bitif   bdt, mode
        jp      lblon               ;turn on lowbat led
        ret
pledon:
        bitif   posbep, flashb      ;should we beep
        jsr     stbeep
        cirbit  pwrled, portcd     ;turn the led on
        ld      erc, #(seccnt/2)+1  ; for .5 seconds
        bitif   lobat2, mode
        ret                         ;don't affect low bat led
        bitif   bdt, mode
        jp      lbloff              ;turn off lowbat led
        ret lblon:
        bitif   lobat2, mode
        jsr     stbeep              ;beep if low bat 2 mode
        ld      b, #oplow
        setbit  lowbat, [b]
        jmp     putlow lbloff:
        jsr     stbeep
lblof0:
        ld      b, #oplow
        cirbit  lowbat, [b]
        jmp     putlow ; FLSHLB uses the counter AVCNST to flash the low bat LED .5sec on every
; second. This register is safe to use because we can't have a low
; battery condition while charging.

flshlb:
        drsz    avcnst              ;test the counter
        ret
        ld      avcnst, #(seccnt/2)+1  ; for .5 seconds
        bitif   lowbat, oplow       ;is the LED already on?
        jp      lbloff              ; then turn it off
        jp      lblon               ; else turn it on stbeep:
```

Page A-lxix

```
            ld      x, #temp                ;pointer for data to be output

; next, set up DRQ5 in OPL
            ld      a, oplow                ;get the op register data
            x       a, portd                ; so we can retreive this later
            ld      a, portd                ; emulate a store instruction
            or      a, #drq5                ;set the drq5 bit in the register save data
            x       a, portd                ; D port data = 00000001 for DRQ5
            ld      b, #portcd
            clrbit  milsed, [b]             ; C0 = 0
            setbit  milstb, [b]             ; C1 = 1 (this starts the DREQ cycle)

; now look for DACK
            ckdack

; next, pull master high in OPL
            ld      b, #portd               ; point to the D port
            setbit  master, [b]             ; D port data = 00000011 for master*
            clrbit  milstb, portcd          ; close the OP Low register ; Set the NT21 index register
            ld      [b], #05                ;point to the sleep control register
            except  iow, 01ED ; write desired data to 0 port
            x       a, [x]                  ;recover the data to output
            x       a, [b]                  ; and store it in port D ; execute the io write exception cycle to port 01EFh (NT21 Control)
            except  iow, 01EF x       a, [x]                  ;and recover original OP low ; clear DRQ and master*
            x       a, [b]                  ; A contains the original OP Low value
            ld      b, #portcd              ; point back to port C
            setbit  milstb, [b]             ; turn off master mode
            clrbit  milstb, [b]

; now set IO_M* to M in OPH
            ld      b, #ophigh              ;point to the op register data storage
```

Page A-lxx

```
        clrbit  +om, (b)            ;point to memory
        jmpl    puthi cpuhld:
        ld      b, #portlp          ;point to the L port
        clrbit  cpuint, wkpnd       ;clear the interrupt pending flag
        bitif   cpuint, (b)         ;wait for the interrupt to be acknowledged
        jsrl    delay               ;  by the host cpu
        ld      a, oplow            ;get the op register data
        x       a, portd            ; so we can retreive this later
        ld      a, portd            ; emulate a store instruction
        or      a, #drq5            ;set the drq5 bit in the register save data
        x       a, portd            ; D port data = 00000001 for DRQ5
        ld      b, #portcd
        clrbit  milsad, (b)         ; C0 = 0
        setbit  milstb, (b)         ; C1 = 1 (this starts the DREQ cycle)

ckdeck

; next, pull master high in OPL
        ld      b, #portd           ; point to the D port
        setbit  master, (b)         ; D port data = 00000011 for master*
        clrbit  milstb, portcd      ; close the OP Low register
        x       a, (b)              ; recover current OP Low settings
        x       a, oplow            ; and save setbit  hldreq, mode        ;Tell interested parties about hold
        ld      b, #wkpnd
        clrbit  kbdint, (b)         ;Clear keyboard but not timer to start
        setbit  kbdint, wken
        setbit  cpuint, wken
        ret clrold:
        ld      cnt, #8             ;start with save area cleared
        ld      b, #crgrdg
clrcrg:
        clr     a
        x       a, (b+)
        drsz    cnt
        jp      clrcrg
```

Page A-lxxi

```
        ret drvof1:
        ld      hdcmd, #0E0             ;Enter standby command ; This routine will become master and write the data in hdcmd to the Hard disk ctl reg
;
iowif7:

; first set IO_M" to 10 in OPH
        ld      b, #ophigh              ;point to the op register data storage
        setbit  iom, (b)                ; O port data = 10000000 for IO
        jsrl    puthi ld      x, #hdcmd               ;pointer for data to be output ; next, set up DRQ5 in OPL
        ld      a, oplow                ;get the op register data
        x       a, portd                ; so we can retreive this later
        ld      a, portd                ; emulate a store instruction
        or      a, #drq5                ;set the drq5 bit in the register save data
        x       a, portd                ; O port data = 00000001 for DRQ5
        ld      b, #portd
        clrbit  milsad, (b)             ; C0 = 0
        setbit  milstb, (b)             ; C1 = 1 (this starts the DREQ cycle)

; now look for DACK
        ckdack

; next, pull master high in OPL
        ld      b, #portd               ; point to the O port
        setbit  master, (b)             ; O port data = 00000011 for master*
        clrbit  milstb, portd           ; close the OP Low register except  ior, 03F6               ;read alternate status port
        x       a, (b)                  ;save OP Low                    **
        ld      a, #L(03F6)             ;to retreive io data
        jsrl    ior300
        ifbit   7, a                    ;test disk busy status
        jp      hdbusy                  ;try again later
        ifeq    pending, #0             ;no delay
```

Page A-lxxii

```
        jp      hdwrit
        drsz    pendng              ;else lets wait a while
        jp      hdexit
hdwrit:
        x       a, [b]              ;recover registers for now **

; write desired data to D port
        x       a, [x]              ;recover the data to output
        x       a, [b]              ; and store it in port D ; execute the io write exception cycle to port 01F7h (HD Control)
        except  iow, 01F7 x       a, [x]              ;and recover original OP low

; clear DRQ and master*
        x       a, [b]              ; A contains the original OP Low value
hdexit:
        ld      b, #portcd          ; point back to port C
        setbit  milstb, [b]         ; turn off master mode
        clrbit  milstb, [b]

; now set [O_M- to M in OPM
        ld      b, #ophigh          ;point to the op register data storage
        clrbit  iom, [b]            ;point to memory
        jsrl    puthi
        clrbit  hdcs0, wkpnd        ;so we don't interrupt again
        ret hdbusy:
        ld      pendng, #12         ;set the flag for 60 msec delay
        jp      hdexit ; The XSUMP routine checksums the system parameter data area to validate
; the initial settings in case of a total system power failure that
; causes the COP setings to be invalid xsump:
        clr     a
        ld      x, #sysctim
        ld      b, #temp
```

Page A-lxxiii

```
        x       a, [b]           ;Clear the accumulator
        ld      cnt, #4
xslop:
        ld      a, [x+]          ;Get the parameter
        add     a, [b]           ; and add it to the accumulator
        x       a, [b]           ;save it back
        drsz    cnt
        jp      xslop
        ld      a, [b]           ;return with calculated checksum in A
        ret                      ; X points to stored checksum ; GET1P gets 1 parameter to the data location DEBUG for test purposes get4p:
        ld      cnt, #4
        jp      getp
get1p:
        ld      cnt, #1
getp:
        ld      x, #debug
        jmp     gvparm .=01E00
m1e00:
        laid                     ;Allow COP to store parameters
        ret                      ; at 1E02-1EFF .=01F00                  ;place this at the top of SRAM ; The GETCMD routine will return the value of a command
; placed at address 1F80h by the host CPU. The COP can
; then call GSPARM or GVPARM to retrieve the parameters
; to an area in the data ram of the COP processor
;
; On Entry:
;
;       CNT contains the number of parameters to retreive
;
;   for GVPARM
```

Page A-lxxiv

```
;
;       X contains the address to store the parameters in COP data space
;
; On Exit:
;
;       The PSAVE area contains the parameters getcmd:
        ld      a, #080         ;Address of command on this page
        laid                    ; get contents of 1F80h
        ret gsparm:
        ld      x, #psave       ;point to the COP parameter area
gvparm:
        ld      b, #temp        ;temporary storage
        ld      [b], #081       ;address of parameters in SRAM
ploop:
        ld      a, [b]          ;address of current parameter
        laid                    ; get parameter
        x       a, [x+]         ; and store it in data space
        x       a, [b]          ;get address
        inc     a               ; and bump it
        x       a, [b]          ; then put it back for next time
        drsz    cnt             ;decrement the counter
        jp      ploop           ; and continue till done
        ret .end
```

Page A-lxxv

```
; EXCEPTION MACROS

IOR     =   04C00       ; I/O read exception cycle
        IOW     =   06000       ; I/O write exception cycle
        SRAMW   =   04000       ; SRAM write exception cycle
        SCDONE  =   06000       ; Set CDONE bit exception cycle ;       IOR forces the read data to be in the range C00h - FFF ;       the macro EXCEPT takes three parameters:  type (one of the above),
;       addr (four hex digits giving the exception address)

.macro  except, type, addr
        .byte   0AD
        .addrw  type | addr
        .endm ; The BIT macros (SETBIT, CLRBIT, BITIF) allow the user to specify the
; bit to be set/reset/tested using the same label name that is used as
; a mask value.

.macro  bit, bitnum        ;yields the mask value corresponding
        .set    mask,1
        .if     bitnum
        .do     bitnum             ; to the bit number
        .set    mask,mask*2
        .enddo
        .if     N(mask)
        .set    mask,N(mask)
        .endif
        .endif
        .endm .macro  bitnum, mskval     ;gets the bit number coresponding
                                   ; a mask value
        .set    dummy, mskval
        .set    bitnum,0
        .do     7
        .set    dummy,dummy/2
        .if     dummy
```

Page A-lxxvi

```
        .set    bitnum,bitnum+1
        .else
        .exit
        .endif
    .enddo
    .endm .macro  setbit, dummy, addr     ;getnerate the sbit instruction
                                    ; from the mask label
    .if     a<2
    .error  No Paramerter for bit operation
    .else
    bitnum  dummy
    sbit    bitnum, addr
    .endif
    .endm .macro  clrbit, dummy, addr     ;getnerate the rbit instruction
                                    ; from the mask label
    .if     a<2
    .error  No Paramerter for bit operation
    .else
    bitnum  dummy
    rbit    bitnum, addr
    .endif
    .endm .macro  bitif, dummy, addr      ;getnerate the ifbit instruction
                                    ; from the mask label
    .if     a<2
    .error  No Paramerter for bit operation
    .else
    bitnum  dummy
    ifbit   bitnum, addr
    .endif
    .endm
```

Page A-lxxvii

```
; The macro CKDACK generates the code to check for dma acknowledge
; using a local label so that the label names do not have to be changed
; everyplace this is used .macro  ckdack
        ld      b, #ackprt          ;point to the port that DACK is on
        .mloc   cdack
cdack:
        bitif   dack, [b]
        jp      cdack
        .endm
```

What is claimed is:

1. Apparatus for electrically switching between a plurality of parallel connected battery sources to power a load to enable an even discharge among said sources, the apparatus comprising:

switch means for alternatively electrically connecting or disconnecting each of said sources with said load responsive to a control signal, wherein one of said sources is connected to said load and the remaining ones of said sources are disconnected and inactive;

means connected to said sources for reading the voltage and amperage of said one of said sources connected to said load; and control means connected to said switch means and to said reading means for periodically computing an instantaneous power value from said read voltage and amperage of said one of said sources connected to said load, for accumulating said periodically computed values, for comparing said accumulated value with a predetermined power value, and for providing a control signal to said switch means to electrically disconnect said one of said sources connected to said load and to electrically connect another one of said sources to said load when said accumulated value exceeds said predetermined power value, wherein said accumulated value represents a cumulative amount of power output by said one of said sources since said one of said sources was last disconnected and inactive and said predetermined power value is substantially less than the total power available from said one of said sources when said one of said sources is fully charged.

2. A method of controlling the electrical connection of each of a plurality of battery sources to power a load, the method comprising the steps of:

connecting one of said sources to said load;

reading the voltage and the amperage of said one of said sources connected to said load;

periodically computing an instantaneous power value from the respective voltages and amperages of said one of said sources electrically connected to the load;

accumulating said instantaneous power values to determine an accumulated power value;

comparing said accumulated power value with a predetermined power value, wherein accumulated power value represents a cumulative amount of power output by said one of said sources since said one of said sources was last disconnected and inactive and said predetermined power value is substantially less than the total power available from said one of said sources when said one of said sources is fully charged; and electrically disconnecting said source connected to said load and connecting another one of said sources to said load, when said accumulated power value exceeds said predetermined power value, to enable an even discharge among said sources.

3. The method of claim 2 wherein said step of computing an instantaneous power value is performed once each second.

* * * * *